United States Patent [19]
Hosokawa

[11] Patent Number: 5,816,921
[45] Date of Patent: Oct. 6, 1998

[54] DATA TRANSFERRING DEVICE AND VIDEO GAME APPARATUS USING THE SAME

[75] Inventor: Osamu Hosokawa, Tokyo, Japan

[73] Assignee: Sega Enterprises, Ltd., Tokyo, Japan

[21] Appl. No.: 648,157

[22] PCT Filed: Sep. 26, 1995

[86] PCT No.: PCT/JP95/01946

§ 371 Date: Jul. 19, 1996

§ 102(e) Date: Jul. 19, 1996

[87] PCT Pub. No.: WO96/10230

PCT Pub. Date: Apr. 4, 1996

[30] Foreign Application Priority Data

Sep. 27, 1994 [JP] Japan .................................. 6-231451
Sep. 28, 1994 [JP] Japan .................................. 6-232725
Sep. 30, 1994 [JP] Japan .................................. 6-236270

[51] Int. Cl.$^6$ .................................................... G06F 12/00
[52] U.S. Cl. .............................................. 463/43; 395/823
[58] Field of Search ................................ 463/40, 41, 42, 463/43; 395/306, 307, 308, 309, 310, 280, 281, 821, 822, 823, 824, 825, 842, 845, 846, 847, 848

[56] References Cited

U.S. PATENT DOCUMENTS

| | | | |
|---|---|---|---|
| 4,777,621 | 10/1988 | Miner et al. | 364/900 |
| 5,168,561 | 12/1992 | Vo | 395/425 |
| 5,214,775 | 5/1993 | Yabushita et al. | 395/306 |
| 5,218,681 | 6/1993 | Gephardt et al. | 385/281 |
| 5,628,026 | 5/1997 | Baron et al. | 395/821 |

FOREIGN PATENT DOCUMENTS

| | | |
|---|---|---|
| 0303752 A1 | 2/1989 | European Pat. Off. . |
| 0388300 A2 | 9/1990 | European Pat. Off. . |
| 0432799 A2 | 6/1991 | European Pat. Off. . |
| 61-235959 | 10/1986 | Japan . |
| 61-267162 | 11/1986 | Japan . |
| 63-68957 | 3/1988 | Japan . |
| 2-284253 | 11/1990 | Japan . |
| 5-25001 | 6/1993 | Japan . |
| WO 93/12486 | 6/1993 | WIPO . |

OTHER PUBLICATIONS

Supplementary European Search Report for Corresponding European Application No. EP 95932240.5.
Patent Abstracts of Japan, vol. 012, No. 295 (p–743), Aug. 11, 1988 (abstract of JP 63068957 A, Mar. 28, 1988).
Patent Abstracts of Japan, vol. 011, No. 121 (p568), Apr. 16, 1987 (abstract of JP 61267162 A, Nov. 26, 1986).
Supplementary European Search Report for corresponding European Application EP 95932240.

*Primary Examiner*—George Manuel
*Attorney, Agent, or Firm*—Dickstein Shapiro Morin & Oshinsky LLP

[57] ABSTRACT

A data transferring device transfers data via data buses between a plurality of data transmitting and receiving devices, and can continuously transfer data read out from a memory. The data transferring device includes a DMA (Dynamic Memory Access), which writes readable data in the memory per a plurality of bytes from a byte boundary. The data transferring device has the advantageous to be applied to a video game apparatus. The data transferring device has a basic structure having a plurality of data transmitting and receiving devices, a plurality of bus interface circuits connected via buses corresponding to each of the plurality of the data transmitting and receiving devices a direct memory access circuit (DMA), which transfers the data transmitted to one bus interface circuit to another bus interface circuit. Further, the plurality of bus interface circuits divide and unite data in correspondence with size of the connected buses to transfer the data to another bus interface circuit.

14 Claims, 22 Drawing Sheets

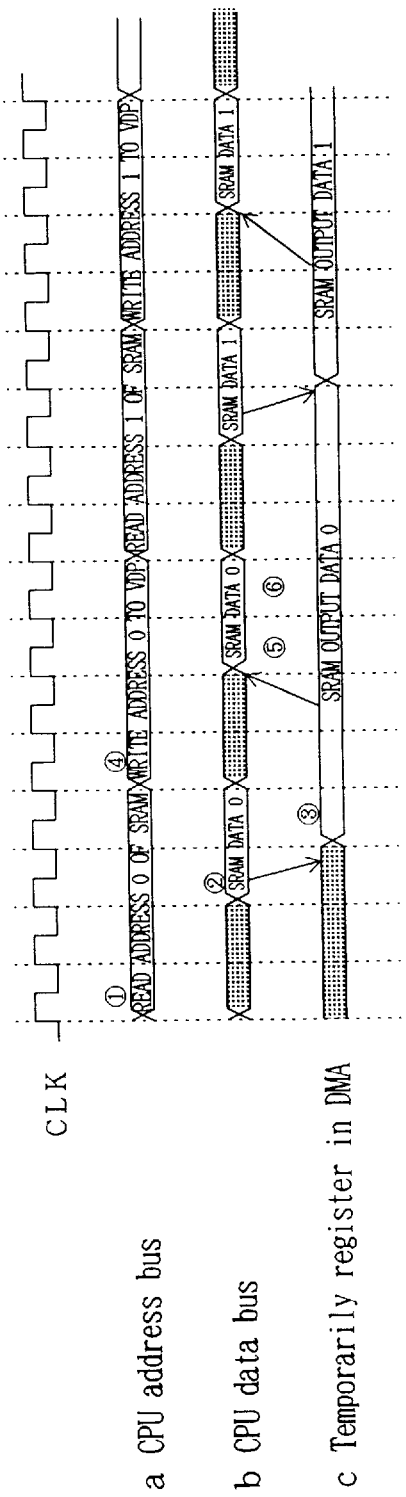

FIG. 5

| BUS NAME | BUS SIZE | BUS CLOCK | CONNECTED DEVICES |
|---|---|---|---|
| CPU-Bus | 32bits | 28MHz | CPU, SDRAM, DCC |
| A-Bus | 16bits | 28MHz | CDROM, CARTRIDGE, etc. |
| B-Bus | 16bits | 28MHz | VDP1, VDP2, SCSP |

F I G. 9
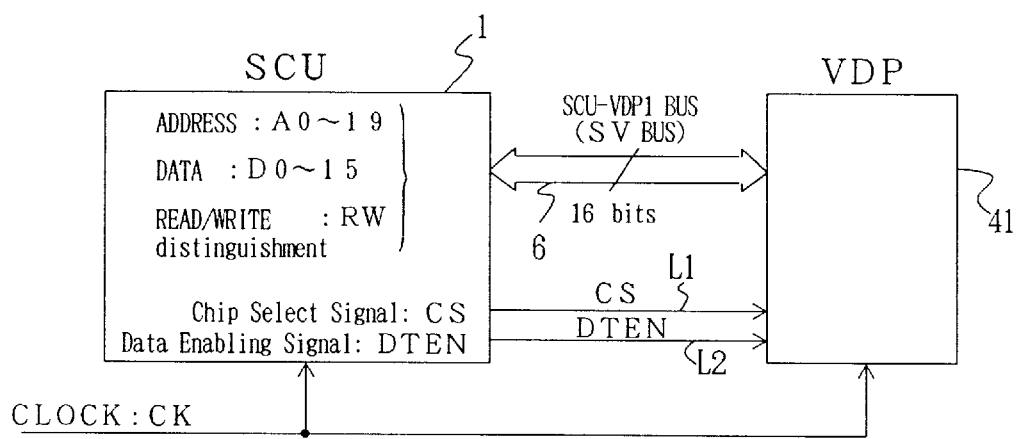

DATA TRANSFERRING DEVICE AND VIDEO GAME APPARATUS USING THE SAME

FIELD OF THE INVENTION

The present invention relates to a data transferring device. More particularly, it relates to a device, which transmits and receives data through data buses between a plurality of data transmitters. A data transmitting and receiving device is here defined as a circuit device, which can send out to and receive the data from the data buses. Therefore, a memory device may be also considered as a data transmitting and receiving device. Further, the present invention relates to a data transferring device, which can continuously transfer data read out from the memory device. Furthermore, the present invention relates to a data transferring device to write data from a byte boundary to the memory device. Additionally, it relates to a video game apparatus employing the above-described transferring device.

BACKGROUND OF THE INVENTION

Data processing equipment, such as a video game apparatus, i.e., an information processing apparatus, includes a plurality of functional circuits, each of which is assigned to perform a specific function and has a data transmitting and receiving device as defined above.

It is necessary to transmit and receive data with a high speed between a plurality of data transmitting and receiving devices, for example, between a CPU and a memory device.

Therefore, a plurality of CPUS, memory devices, or the like, as data transmitting and receiving devices are connected to a data bus. Data transmitting is performed via the data buses between the data transmitting and receiving devices. In a conventional system for transmitting addresses via the buses, all of data transmitting and receiving devices, such as a CPU, a RAM, and a VDP (video display processor), are connected to one data bus.

Therefore, in the conventional system having such a structure as the above, data existing on the data bus should be only one at a certain timing to prevent from collision of data.

Accordingly, it becomes a problem not to concurrently transfer various kinds of data between, for example, a CPU and a RAM, and an external memory and a VDP. Further, when there are differences between bus sizes, with which data transmitting and receiving devices can interface, each data transmitting and receiving device should have an own interface circuit to interface with a common bus, that is, a CPU bus.

On the other hand, in a video game apparatus, i.e., a data processor or an information processing apparatus, an external storage, that is, a memory cartridge is detachably connected to a console unit of the video game apparatus, and data read out from the memory cartridge is transferred to the console unit via a bus.

In recent years, a processing speed of CPUs has been increased, and consequently, the speed of transferring data in a system has also become fast.

In such a case, however, it should be considered that the high speed of transferring data causes leakage of impediment radio waves to the outside. FCC (Federal Communication Commission), or the like, has predetermined a standard to regulate the leakage of the impediment radio waves.

Therefore, it becomes a problem not to make a high speed in transferring data on the bus to the console unit from an external storage device, which is detachably connected to the console unit, due to such the FCC standard.

Meanwhile, as described above, in a data processor, such as a video game apparatus, it is required that data can be transferred with a high speed between a CPU and a memory, which are considered as a functional circuit.

In this respect, to reduce a functional load on a CPU, it has been introduced to employ a direct memory access device (DMA) for transmitting or transferring data.

FIG. 1 is to explain an operation of a conventional system employing the direct memory access device. FIG. 2 illustrates an operational timing chart for the system of FIG. 1.

FIG. 1 shows a structural example of a video game apparatus, which includes a direct memory access circuit (DMA) 60, a CPU 61 for executing and controlling a game program, a work RAM 62 for storing data during game execution, and a video processor (VDP) 63 for controlling scroll pictures and displayed sprites or models. A data bus 64 is connected with each of the above-described circuits.

With this structure, the operation of transferring data sent from the RAM 62 to the VDP 63 will be described, as referring to the timing chart shown in FIG. 2. The DMA 60 sends out an address to read data out from the RAM 62, as synchronized with a clock signal CLK, and sends the read out data to an address bus, which is not shown in the diagram, but is provided independently from the data bus 64 (see a ① of FIG. 2).

Data are read out from the RAM 62 on the bus 64 according to the read address (b ② of FIG. 2). The data read out from the RAM 62 on the bus 64 is temporally stored in a temporal register in the DMA 60, not shown in the diagram, (c ③ of FIG. 2).

Additionally, a write address is outputted from the DMA 60 to the above-described address bus ④ of FIG. 2). The content in the temporal resistor in the DMA 60 is outputted to the bus 64 simultaneously with the write address (b ⑤ of FIG. 2).

Consequently, the data read out from the RAM 62 on the bus 64 are written to the VDP 63 according to the write address outputted to the address bus (b ⑥ of FIG. 2).

In this way, both of the address bus and the data bus should be employed with time-division according to FIG. 2, for accessing the RAM 62 and the VDP 63. Therefore, it is impossible to continuously read and write data from the RAM 62 and to the VDP 63.

On the contrary, in recent years, a synchronous DRAM, of which an input and an output are synchronized with a clock signal has been employed as a RAM 62 to transfer data with a high speed. However, with the above-described conventional structure, it is impossible to use a feature of continuously reading data out from the synchronous DRAM.

Concurrently, it is impossible to continuously process data. Therefore, it is also difficult to process the data with a high speed in the VDP 63.

In the above-described video game apparatus, the RAM should include a boundary, which is defined by a unit of a plurality of bytes in dependence on a bit width of the CPU, and it is, therefore, necessary to read out the data by each unit of the plurality of bytes (hereinafter, the unit is referred to as a long-word at need). Therefore, a bit map memory, which is used for displaying a video image as a set of pixels, includes a boundary of a unit including a plurality of bytes.

FIG. 3A shows a data structural example 81 in the conventional RAM. For example, when a RAM having a width of 32 bits (four bytes) is taken as an example, data are read out from the RAM, as one unit of 4 bytes.

Therefore, a long-word boundary 83 exists per one unit of four bytes, which are the plurality of bytes. In FIG. 3A, data "A", "B", "C", and "D" are respectively stored in the 0th byte, the 1th byte, the 2nd byte, and the 3rd byte. Then, the data "ABCD" can be read as a long word at once.

Over against this, a data structural example 82 of the bit map memory shown in FIG. 3B also includes a long-word boundary 83 per a unit of a plurality of bytes, since data are written per a unit of a plurality of bytes.

If one pixel is expressed with 8 bits (1 byte), 4 pixels arranged horizontally in the bit map are expressed with one long-word (4 bytes). Accordingly, a long-word boundary 83 is present per 4 pixels in a horizontal direction.

With this memory structure, four times of accessing should be required, in order to write data for 16 pixels, when writing data from the long-word boundary 83. However, in the bit map memory, it is required to write per a pixel, i.e., a byte, to construct display images freely. In this case, as shown in FIG. 3B, it is required for writing data from the byte boundary 84 to write the data per a byte.

Therefore, it becomes a problem such that 16 times of access processing are required to write data for 16 pixels, because of writing from the byte boundary 84 and writing per a byte, thus causing delay in a transferring speed of the DMA.

SUMMARY OF THE INVENTION

Accordingly, it is an object of the present invention to provide a data transferring device, which can concurrently transfer data between a plurality of data transmitting and receiving devices.

It is a more specific object of the present invention to provide a data transferring device, which has no need to provide an interface circuit for interfacing with a CPU bus per a data transmitting and receiving device, even if bus sizes are different for a plurality of data transmitting and receiving devices.

More particularly, it is an object of the present invention to provide a video game apparatus employing a data transferring device, which can employ a high speed CPU, and transmit data read out from an external storage device, which is detachably connected to a console unit of the video game apparatus, to the high speed CPU via a bus.

It is another object of the present invention to provide a data transferring device, which can transmit data employing a feature of a synchronous DRAM, which can read out data continuously.

It is still another object of the present invention to provide a data transferring device employing a DMA, which can reduce the times of accessing to a bit map memory, even if data are written to a bit map memory from a byte boundary.

It is a further object of the present invention to provide a data transferring device employing a DMA, which can reduce a transmission time when writing data from a byte boundary.

It is a still further object of the present invention to provide a video game apparatus employing a data transferring device according to the present invention, which can make the scrolling and sprite processing with a high speed in a video display processor.

To realize the above-described objects, a data transferring device according to the present invention is connected to a plurality of data transmitting and receiving devices via corresponding external buses, for transferring data between the plurality of the data transmitting and receiving devices, and comprises a plurality of bus interface circuits, to which each of the corresponding external buses is connected; and a direct memory access circuit operatively connected to the plurality of bus interface circuits for transferring the data between said the plurality of bus interface circuits.

Further, in the data transferring device according to the present invention, at least two of the plurality of bus interface circuits are respectively connected to external buses, each having a different bus size from that of the other, and a data processing circuit for dividing or uniting data to accord with the bus size of either one, to which the data are transferred, of the external buses, when the data are transferred between the external buses, each having different bus sizes.

Additionally, in the data transferring device according to the present invention, the plurality of bus interface circuits and the direct memory access circuit are connected by an internal bus, which has a bus size corresponding to the maximum one within the bus sizes, which said external buses have.

In the data transferring device according to the present invention, the data processing circuit divides data on a first external bus having a first bus size and sequentially transfers the divided data to a second external bus having a second bus size, which is smaller than the first bus size according to the plurality of timings.

On the contrary, in the data transferring device according to the present invention, the data processing circuit unites data for a plurality of timings on a second external bus having a second bus size and sequentially transfers the united data to a first external bus having a first bus size, which is larger than the second bus size.

Further, an information processing apparatus according to the present invention comprises a data transferring device, a plurality of data transmitting and receiving devices, and a plurality of external buses for connecting the data transferring device to corresponding one of the plurality of the data transmitting and receiving devices, said data transferring device having a plurality of bus interface circuits, to which each of the corresponding external buses is connected, and a direct memory access circuit operatively connected to the plurality of the bus interface circuits for transferring the data between said the plurality of the bus interface circuits, and a bus size of one external bus connected to one of the data transmitting and receiving devices being the minimum size within the external buses connected to the data transferring device.

In the present invention, as described above, the data transferring device includes a system control unit connected to a plurality of data transmitting and receiving devices via corresponding buses.

The data transferring device is constituted with a plurality of bus interface circuits, to which the corresponding buses are connected, and a direct memory access (DMA) circuit, which transfers data sent to the one bus interface circuit to another bus interface circuit, and the plurality of bus interface circuits divide and unite the data in correspondence with the bus sizes of connected buses.

Accordingly, it becomes easy to transfer data between the data transmitting and receiving devices, even if the bus sizes of the connected buses are different. Further, since the plurality of bus interface circuits, to which corresponding buses are connected, are provided, there is no necessary to provide any interface circuit on each of the data transmitting and receiving devices to respectively interface with a CPU.

Further, a data transferring device, which transfers data with the use of a characteristic of a synchronous DRAM, which can continuously read data, is connected to a first external bus and a second external bus having 1/n (n means positive integer) of the bus size of the first external bus, and includes first and second bus interface circuits, to which the first and second external buses are respectively connected, a direct memory access circuit for transferring data on the first external bus, which are transmitted to the first bus interface circuit, to the second bus interface circuit, and an internal bus connected to the first and second bus interface circuits and the direct memory access circuit, having the same bus size as that of the first external bus, the first bus interface circuit converting the data, which are continuously transmitted with a predetermined period synchronized with a clock signal, on the first external bus to the data having 1/n of the predetermined period and outputting the converted data to the internal bus, the direct memory access circuit shifting the data by a 1/n period and re-translating the shifted data to the internal bus, and the second bus interface circuit taking the data of 1/n of the predetermined period, which are re-transmitted from the direct memory access circuit to the internal bus, making the taken data to a continuous data sequence with the 1/n period, and re-translating the continuous data sequence with the 1/n period to the second external bus.

As described above, in the present invention, the bus interface circuit synchronizes with a clock to output data on the first bus to an internal bus of the system control unit, and the second bus interface circuit transmits the data having 1/n of the predetermined period from the direct memory access circuit (DMA) to the second bus within the predetermined period.

It therefore, becomes possible according to the present invention to continuously send data having a predetermined period on the first bus, to the second bus at the predetermined period.

Further, the data transferring device further includes a synchronous DRAM, of which inputs and outputs are synchronized with a clock, connected to the first external bus to read data output from the synchronous DRAM and send the data to the first bus interface circuit. Therefore, it is possible to employ a feature of continuously reading data of the synchronous DRAM.

More particularly, by employing the above-described positive integer n as 2, the second interface circuit can send data taken to the direct memory access circuit (DMA) as upper and lower data of ½ data sequence to the second bus.

Even if the data is written from a byte boundary to the bit map memory, a data transferring device employing a DMA, which can reduce times of access processing, according to the present invention includes a first latch circuit for latching n bytes of data, which are read in, a second latch circuit operatively connected to the first latch circuit for latching (n−1) bytes of the data output from the first latch circuit, and a selector supplied with the n bytes of data latched in the first latch circuit and combined n bytes, which are formed by combining the latched n byte data of the first latch circuit with the latched (n−1) byte data of the second latch circuit and shifting sequentially by one byte, for selecting a desired set of n bytes of data from the supplied n bytes.

Therefore, in the DMA, data read per a plurality of bytes from the first memory is shifted to transfer to the second memory per a plurality of bytes. Accordingly, it is becomes possible to write from the byte boundary on transferring per a plurality of bytes in the second memory. For example, at most, 5 times of access processing are required to transfer data for 16 pixels, thus sharply reducing a transmission time.

Further, it can be realized to constitute the circuit with a simple structure, such as a pair of latch circuits and a selector.

Furthermore, as the selector selects data, it can be improved to reduce delay time for the shift operation, thus transferring data with a higher speed.

The objects, features and advantageous of the present invention will be apparent from the following detailed description of the preferred embodiment of the present invention with reference to the drawings.

BRIEF DESCRIPTION OF THE DRAWINGS

FIG. 2 shows an operational timing chart corresponding to FIG. 1.

FIG. 5 shows a structural example of each bus shown in FIG. 4.

FIG. 9 illustrates a signal structural example of the embodiment of the present invention.

DESCRIPTION OF THE PREFERRED EMBODIMENTS

Figure 4:
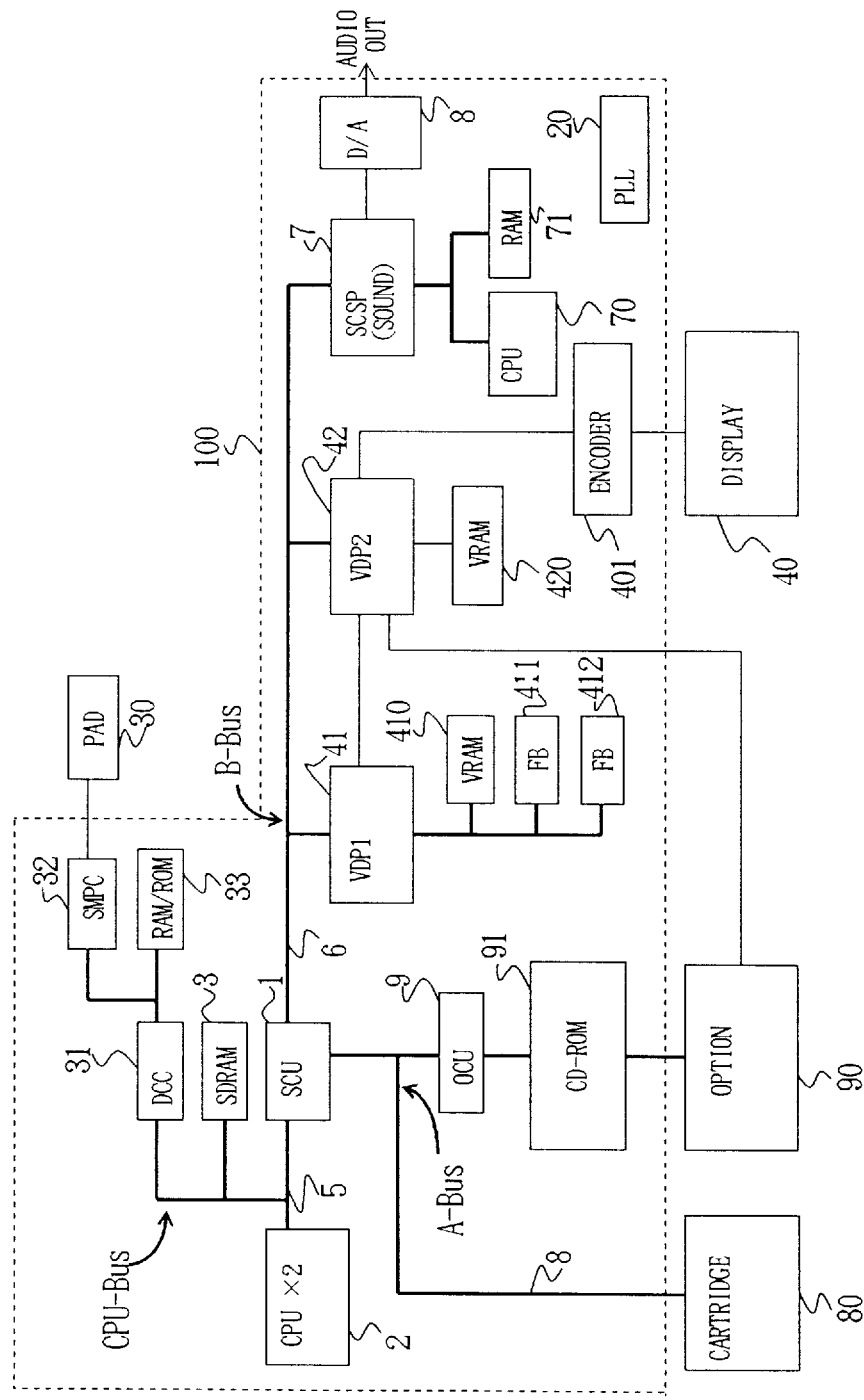
FIG. 4 is a block diagram of an embodiment of the present invention.

FIG. 4 shows an embodiment of the present invention, and shows a block diagram of the embodiment, when employing a data transferring device according to the present invention in a video game apparatus. Throughout the following descriptions, the same reference numerals are used to denote and identify corresponding or identical components.

In FIG. 4, an area 100 enclosed with a dotted line is a console unit of the video game apparatus.

A first bus (CPU-BUS) 5, a second bus (B-BUS) 6, and a third bus (A-BUS) 8 are external buses for the data transferring device, and a CPU and a memory or the like are connected as a data transmitting and receiving device corresponding to each of the external buses. The data transmitting and receiving device, as described above, is defined as a circuit device, which can transmit and receive data to and from the data bus.

Further, the first bus (CPU-BUS) 5, the second bus (B-BUS) 6 and the third bus (A-BUS) 8 are commonly connected to a system control unit 1. Throughout the latter described embodiments, the system control unit 1 is corresponding to a data transferring device, which is an object of the present invention.

In the example shown in FIG. 4, the first bus (CPU-BUS) 5 includes a bus size of 32 bits, and each of the second bus (B-BUS) 6 and the third bus (A-BUS) 8 has a bus size of 16 bits.

In FIG. 4, a main CPU 2 includes a pair of high-speed CPUs to control the entire of the apparatus. A synchronous DRAM 3 is a work RAM employed by the main CPU2.

The system control unit 1 has a function for controlling each of the above-described buses. A structural example of the system control unit 1 will be explained later, as accompanied with FIG. 6.

Reference numerals 41 and 42 are first and second video display processors (VDP).

The first VDP 41 has a function for controlling to display sprites or models on a screen. A video RAM 410 is connected to the first VDP 41. The video RAM 410 stores control commands for the first VDP 41 and character data.

Further, frame buffer memories (FB) 411 and 412 are connected to the first VDP 41. Each of the FBs 411 and 412 has a duplexed buffer structure, which is formed with a pair of memory devices. When writing image data for one frame to one memory device, image data for another one frame may be read out from the other memory device.

The second VDP 42 controls scrolling of a picture on a screen and determines a priority order of displaying a picture on a screen. A video RAM 420 is connected to the second VDP 42. The second video RAM 420 stores a scrolling map, a bit map and coefficient data.

The main CPU 2 and the synchronous DRAM 3 are connected to the system control unit 1 via the first bus (CPU-BUS) 5. Meanwhile, the first and the second VDPs 41 and 42 are connected to the system control unit 1 via the second bus (B-BUS) 6.

Further, a cartridge 80 connected to the third bus (A-BUS) 8 is an external memory device, which is detachably connected to the console unit 100 of the video game apparatus, and has a memory element provided inside to store a game program. The third bus (A-BUS) 8 has the same bus size as that of the second bus (B-BUS) 6.

A CD-ROM drive unit 91 via an optical disk control unit 9 and further a functional block, which generates an external image signal, such as MPEG (Moving Picture Expert Group), are connected to the third bus (A-BUS) 8.

A portion of the third bus (A-BUS) 8 may be extended to the outside of the console unit 100 of the video game apparatus. If a data transferring speed becomes high, the FCC standard can not be fulfilled because of such a problem that impediment radio waves are leaked. One of the objects of the present invention is to solve such the problem.

A CPU controller 31, which is connected to the first bus (CPU-BUS) 5, arbitrates the first bus (CPU-BUS) 5, when a pair of high-speed CPUs 2 access to the synchronous DRAM 3 and the system control unit 1.

The CPU controller 31 supervises controls when the CPU 2 accesses to an I/O controller (SMPC) 32 and a RAM/ROM 33. A control pad 30, which my be detachably connected to the console unit 100 of the video game apparatus from the outside, is operated by a player.

Further, a converter circuit 401 converts an analog RGB signal, which is output from the second VDP 42, to a video signal. The video signal, which is output from the converter circuit 401 is displayed on a display device 40.

A sound source processor 7 (SCSP) is connected to the second bus (B-BUS) 6 to control the generation of PCM/FM sound. A CPU 70 for sound and a RAM 71 for work of the CPU 70 are connected to the-sound source processor 7, and the CPU controls the sound source processing.

Additionally, a D/A converter 8 is connected to the sound source processor 7 to convert a digital source to an analog signal and then to output an audio output.

A PLL circuit 20 generates a basic clock signal, which is supplied to the entire system. As explained above, in the embodiment of the video game apparatus shown in FIG. 4, the system control unit 1 is employed as a center circuit according to the basic clock from the PLL circuit 20, for interfacing between the different bus sizes of the first bus (CPU-BUS) 5, to which a main CPU 2 and a synchronous DRAM 3 are connected, the second bus (B-BUS) 6, to which the first and second VDPs 41 and 42 are connected, and the third bus (A-BUS), to which a memory cartridge is connected and which extends to the outside of the console unit 100 of the video game apparatus.

More particularly, a structural example of the first bus (CPU-BUS) 5, the second bus (B-BUS) 6 and the third bus (A-BUS) 8 will be explained in accompanying with FIG. 5.

In FIG. 5, the first bus (CPU-BUS) 5 has the bus size of 32 bits, and the CPU 2, the synchronous DRAM 3 and the CPU controller 31 are connected to the first bus 5. The third bus (A-BUS) 8 has the bus size of 16 bits, to which the CD-ROM drive 91 and the cartridge 80 are connected.

Further, the second bus (B-BUS) 6 has the bus size of 16 bits, to which the first and second VDPs 41 and 42, and the sound source processor 7 are connected.

On the first through third buses 5, 6 and 8, data are transferred with a bus clock of 28 MHz, which is based on the basic clock commonly supplied from the PLL circuit 20.

Figure 6:
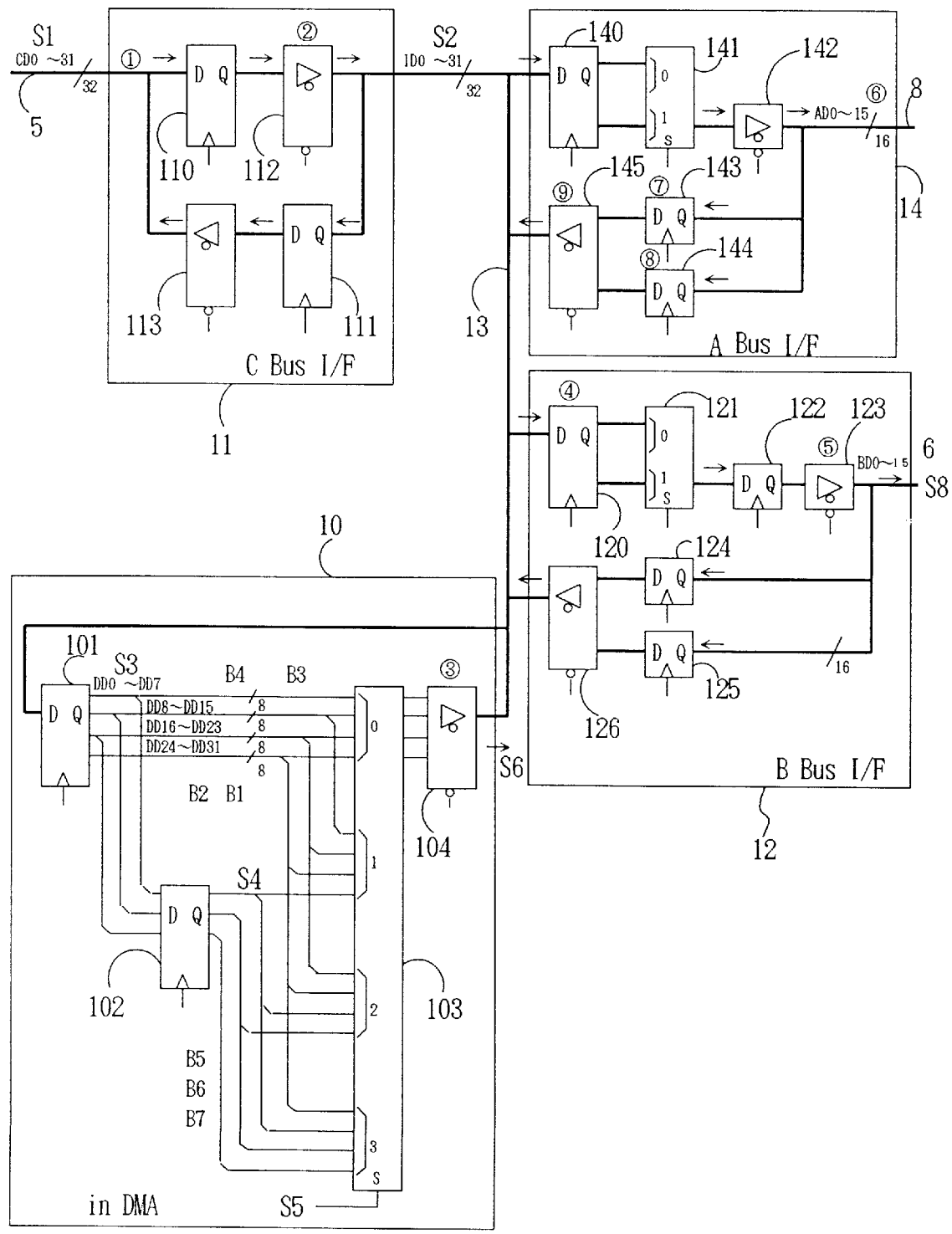
FIG. 6 is a structural block diagram of a system control unit shown in FIG. 4.
Figure 7:
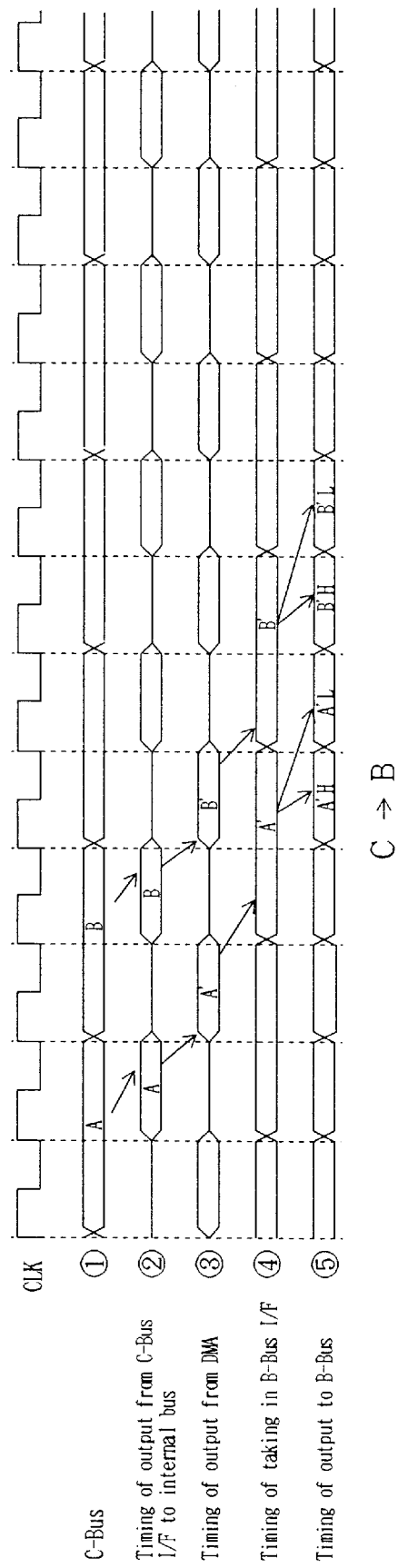
FIG. 7 illustrates an operational timing chart of the embodiment of the present invention.
Figure 8:
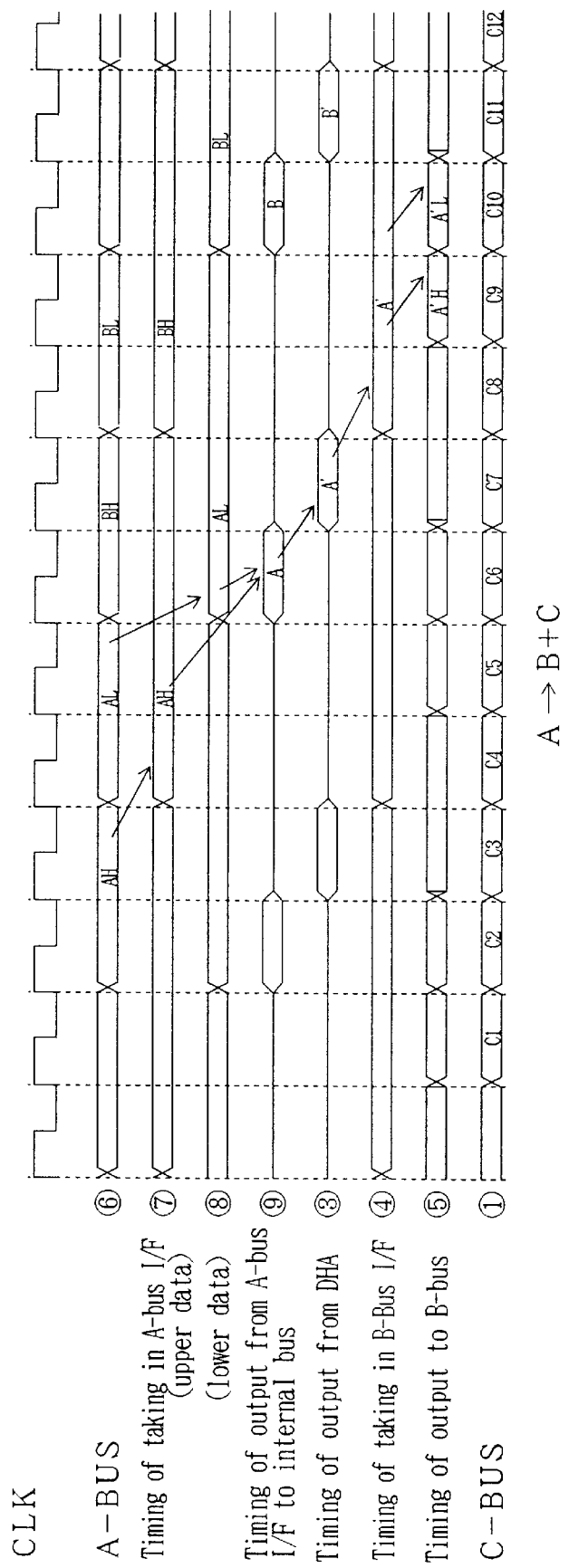
FIG. 8 illustrates an operational timing chart of the embodiment of the present invention.

FIG. 6 shows a detailed structural example of the system control unit 1 as a data transferring device according to the present invention. FIGS. 7 and 8 illustrate operation timing charts of the embodiment of the present invention. FIG. 7 shows the operation timing chart in transferring data from the first bus (CPU-BUS) 5 to the second bus (B-BUS) 6. FIG. 8 shows the operation timing chart in transferring data from the third bus (CPU-BUS) 8 to the second bus (B-BUS) 6 and the concurrent operation status with the first bus (CPU-BUS).

In FIGS. 7 and 8, a numeral in the mark means a timing chart of a signal corresponding to each part shown in FIG. 6.

In FIG. 6, the system control unit 1 includes a first bus interface circuit 11, a second bus interface circuit 12, a third bus interface circuit 14, and a direct memory access circuit (DMA) 10.

These circuits are connected by an internal bus 13 having the bus size of 32 bits, which is the same as that of the first bus (CPU-BUS) 5. Further, the first bus interface circuit 11 is connected to the first bus (CPU-BUS) 5. The second bus interface circuit 12 and the third bus interface circuit 14 are connected to the second bus (B-BUS) 6 and the third bus (A-BUS) 8, respectively.

At first, data repetition from the first bus (CPU-BUS) 5 to the second bus (B-BUS) 6 will now be explained (refer to FIG. 7).

The first bus interface circuit 11 is constituted with flip flops FF 110 and 111, and tri-state buffers 112 and 113, which have TTLs, each having a ternary logic. A basic clock CLK sent from the PLL circuit 20 (refer to FIG. 7) is supplied to these circuits to regulate the operation.

When an input of the flip flop FF 110, i.e., a signal on the first bus (CPU-BUS) 5 is the data read out from the synchronous DRAM 3, the signal continuously appears as shown in ① of FIG. 7. The continuous data depends on a characteristic of the synchronous DRAM 3, in which input and output signals are synchronized with a clock.

In the example shown in FIG. 7, it is controlled so as that one data is continuously outputted on the first bus (CPU-BUS) 5 per two periods of the basic clock CLK (① FIG. 7). Accordingly, the tri-state buffer 112 converts the output on the first bus to the timing signal shown in ② of FIG. 7 and the converted timing signal is output to the internal bus 13.

Meanwhile, the DMA 10 is constituted with flip flop circuits FF 101 and 102, a selecting gate 103, and a tri-state buffer 104. The flip flop FF 101 divides 32 bits of data sent from the internal bus 13 into groups of 8 bits, and inputs the divided groups of 8 bits to the selecting gate 103 via the buses B1 through B4.

The flip flop circuit FF 102 receives the divided upper three groups sent from the flip flop circuit FF 101 and outputs them to the selecting gate 103. The selecting gate 103 has four input terminals 0 to 3. The data of 32 bits, which are divided and subsequently shifted per 8 bits, are inputted to each of the input terminals 0 to 3.

The selecting gate 103 selects and outputs the input of the four input terminals 0 to 3 according to the selecting signal S5, and outputs them to the internal bus 13 through the tri-state buffer 104. Then, the output from the DMA 10 is shown with a timing shown in ③ of FIG. 7.

As shown in FIG. 7, a timing of the output from the DMA 10 (③ of FIG. 7) is shifted by one clock of the basic clock for a timing of the data (② of FIG. 7) outputted from the first bus interface circuit 11. Accordingly, it is possible to prevent from collision of the data (② and ③ of FIG. 7) on the internal bus 13.

Additionally, the second bus interface circuit 12 takes the data outputted from the DMA 10 into the internal bus 13. The second bus interface circuit 12 is constituted with flip flop circuits FF 120, 122, 124 and 125, a selecting gate 121, and tri-state buffers 123 and 126.

The flip flop FF 120 of the second bus interface circuit 12 takes the data on the internal bus 13 with a timing for two periods of a basic clock CLK (④ of FIG. 7).

Further, the selecting gate 121 alternatively selects and outputs the upper 16 bits (A'H) and the lower 16 bits (B'H), and outputs them to the second bus (B-BUS) 6 via the flip flop FF 122 and the tri-state buffer 123 (⑤ of FIG. 7).

A case where the operation on the first bus (CPU-BUS) can be performed concurrently with transferring data on the third bus (A-BUS) 8 to the second bus (B-BUS) 6 will now be described.

The data on the third bus (A-BUS) 8 are generated by synchronizing per two periods of the basic clock CLK (⑥ of FIG. 8). The third bus interface circuit 14 takes the data on the third bus (A-BUS) 8 as the upper and lower data (⑦ and ⑧ of FIG. 8).

That is, the third bus interface circuit 14 has the same structure of that of the second bus interface circuit 12. The data on the third bus (A-BUS) 8 are alternatively inputted to a pair of flip flops FF 143 and 144. The outputs of the flip flops FF 143 and 144 are composed as the data of 32 bits via the tri-state buffer interface circuit 145 and taken to the internal bus 13 (⑨ of FIG. 8).

The DMA 10 receives and shifts the data of 32 bits taken to the internal bus 13 by one basic clock, and again outputs the shifted data of 32 bits to the internal bus 13 ③ of FIG. 8). The second bus interface circuit 12 takes the output signal with 4 basic clock periods (④ of FIG. 8).

Further, the second bus interface circuit 12 the upper data (A'H) and the lower data (A'L) respectively of 16 bits with a basic clock CLK period (① of FIG. 8).

Simultaneously with the above-described operation, it becomes possible to operate the independent data (C1, C2 . . . ) of 32 bits with a period of the basic clock CLK on the first bus (CPU-BUS) (① of FIG. 8).

As explained above, according to the present invention, it becomes possible to transfer data between the data transmitting and receiving devices connected to the buses, the bus sizes of which are different. Additionally, there is no need to provide any bus interface circuit, which interfaces with the CPU bus 5 in each data transmitting and receiving device connected to a corresponding data bus, because the system control unit 1 has internal bus interface circuits, each provided for each data transmitting and receiving device.

FIG. 9 illustrates a detailed embodiment, in which the data sent via the first bus (CPU-BUS) 5 are transferred via the second bus (B-BUS) 6 having a limited bus size by accessing the first VDP 41 or the second VDP 42.

In FIG. 9, the system control unit 1 is shown as an example of transferring data to the first VDP 41.

In order to access and transfer the data sent via the first bus (CPU-BUS) 5 from the system control unit 1 to the corresponding first VDP 41, it is required to transmit address, data, and read/write distinguishing signals.

An address signal is constituted with 20 bits of A0 to 19 (20 signal lines are necessary), a data has 16 bits of D0 to 15 (16 signal lines are necessary), and further, a Read/Write distinguishing signal has a R/W bit (one signal line is necessary). The total lines required are then 37 signal lines.

Further, although the explanation has been abbreviated in FIGS. 4 and 6, there are necessary a chip select signal (CS), which indicates whether or not the system control unit 1 accesses to the VDP 41 (0)/(1), and a data enabling signal (DTEN), which indicates whether or not the data on the second bus (B-BUS) 6 is valid (0)/(1).

Accordingly, the above-described control signals (CS and DTEN) showing the chip selection and the data validity are generated and sent to the two signal lines L1 and L2 as shown in FIG. 9.

Meanwhile, the second bus (B-BUS) 6, which connects the system control unit 1 with the first VDP 41 and the second VDP 42 has the bus size of 16 bits. Accordingly, in the embodiment shown in FIG. 9, the second bus (B-BUS) 6 connecting the system control unit 1 and the first VDP 41 has 16 signal lines or the bus size of 16 bits, and there are further provided two control signal lines (for control signals CS and DTEN) between the system control unit 1 and the first VDP 41.

When the system control unit 1 accesses to the first VDP 41, the system control unit 1 makes the chip select signal line (CS) to LOW (0), and simultaneously divides the addresses into the upper and lower addresses to transmit them to the second bus (B-BUS) 6.

After then, when writing to the first VDP 41, the write data of 16 bits are sent as data 1 (DD1), data 2 (DD2), data 3 (DD3) . . . Further, each data is transmitted to the first bus (B-BUS) 6 per one clock CLK.

Figures 10A, 10B:
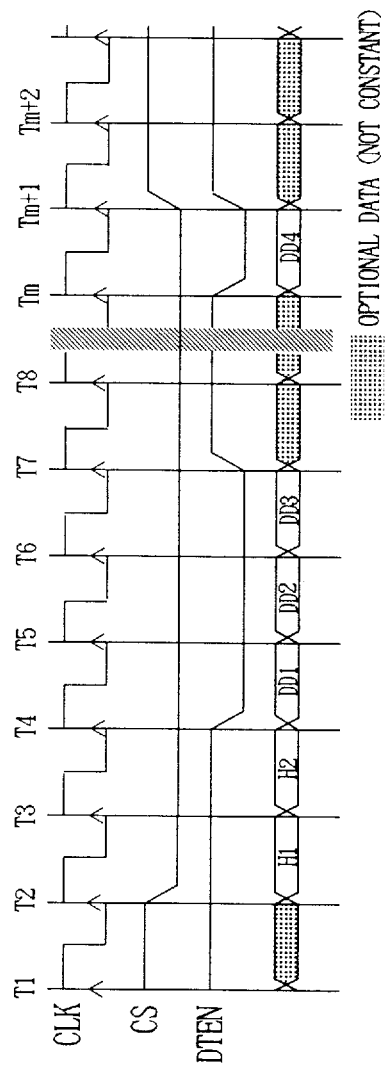
FIG. 10A shows a content of a bus 6 shown in FIG. 9.
FIG. 10B shows a timing chart of the bus 6 shown in FIG. 9.

The content of the above-described B-BUS 6 is shown in FIG. 10A. In FIG. 10A, B15 to B0 are signal line bits of 16 bits, and the mark "–" means a unused bit. The first bus (B-BUS) 6 is divided into H1, H2, DD1, DD2 . . . according to the content.

The address is divided to the upper 12 bits (H1) and the lower 8 bits (H2), and the upper 12 bits (H1) and the lower 8 bits (H2) are sent out. Further, a read/write signal RW is allocated to the remaining bits of the upper address H1. The data (D15 to D0) of 16 bits are allocated to after the DD1.

The first VDP 41 acknowledges the data are addressed to itself by the chip select signal CS transmitted from the system control unit 1, and then takes the data transmitted to itself. When the processing of reading data from the first VDP 41, the VDP 41 takes the address, which are divided into upper and lower addresses, and transmits required data to the second bus (B-BUS) 6.

The system control unit 1 receives the data transmitted from the VDP 41 via the second bus (B-BUS) 6 and transmits them to the first bus (CPU-BUS) 5 or the third bus (A-BUS) 8 via the bus interface circuits 12, 11 and 14 and the DMA 10, as described above.

It is possible to transfer addresses and data between the system control unit 1 and the first VDP 41, similarly or the second VDP 42 via the above-described second bus (B-BUS) 6 of 16 bits.

Further, the operation of the control signals on two control signal lines L1 and L2 respectively for signals CS and DTEN and the second bus (B-BUS) 6 will now be explained in accompanying with a timing chart. FIG. 10B shows the timing chart showing the operation of the second bus (B-BUS) 6.

In FIG. 10B, T1 to T8 . . . express leading timings of the clock CLK with time flow. H1 and H2 show the upper and the lower addresses on the second bus (B-BUS) 6, respectively. DD1 to DD4 are respective data on the second bus (B-BUS) 6.

In FIG. 10B showing the timing chart of the B-BUS 6, at first a chip select signal CS is turned to [LOW (0)] with a timing T2 of the clock CLK. Simultaneously, within the period of timings T2 to T3, the system control unit 1 sends the upper address H1 to the second bus (B-BUS) 6. Subsequently, within the period of timings T3 to T4, the lower address H2 is sent.

When writing from the system control unit 1 to the first VDP 41, data DD1, DD2, DD3 and DD4 are sent from the system control unit 1 to the second bus (B-BUS) 6 per one clock of the clock CLK, following the timing T4. Simultaneously, the DTEN signal showing data validity is turned to [LOW (0)]. The VDP 41 takes the H1, H2, DD1 . . . inside at any time. After DD1, it is possible to write data only when the DTEN signal showing data validity is [LOW (0)].

Accordingly, where the transferring of data can not be performed within a certain period, the system control unit 1 makes the DTEN signal showing data validity to [HIGH (1)], and then the writing operation is abbreviated for the first VDP 41.

In the example of FIG. 10B, it is possible to output the data DD4 on timing Tm. Therefore, the system control unit 1 makes the DTEN signal showing data validity to [LOW (0)] again, and simultaneously, outputs data DD4 within the period of timings Tm to Tm+1.

FIG. 10B shows an example of writing four data of DD1 to DD4. The chip select signal CS becomes [HIGH (1)] with timing Tm+1 to finish writing to the VDP 41.

Meanwhile, when reading out from the first VDP 41, the data DD1, DD2, DD3 and DD4 are outputted from the VDP 1 per one clock of the clock CLK, following the timing T4.

In this case, the DTEN signal showing data validity transmitted from the system control unit 1 is ignored, and the continuous data DD1, DD2, DD3 and DD4 are taken in the system control unit 1 at any time.

If a constant number of data read processing is finished, the system control unit 1 makes the chip select signal CS to [HIGH (1)] to finish the data read accessing.

Further, a case where the data read out from a RAM connected to the first bus (CPU-BUS) 5 to a RAM connected to the second bus (B-BUS) 6 will be now considered. In this case, as described according to the explanation of FIG. 4, the synchronous DRAM 3 is employed as the RAM connected to the first bus (CPU-bus) 5. This is the second feature of the present invention, and it is possible to transfer data with employing a characteristic of the synchronous DRAM 3, from which data may be continuously read out.

Figure 11:
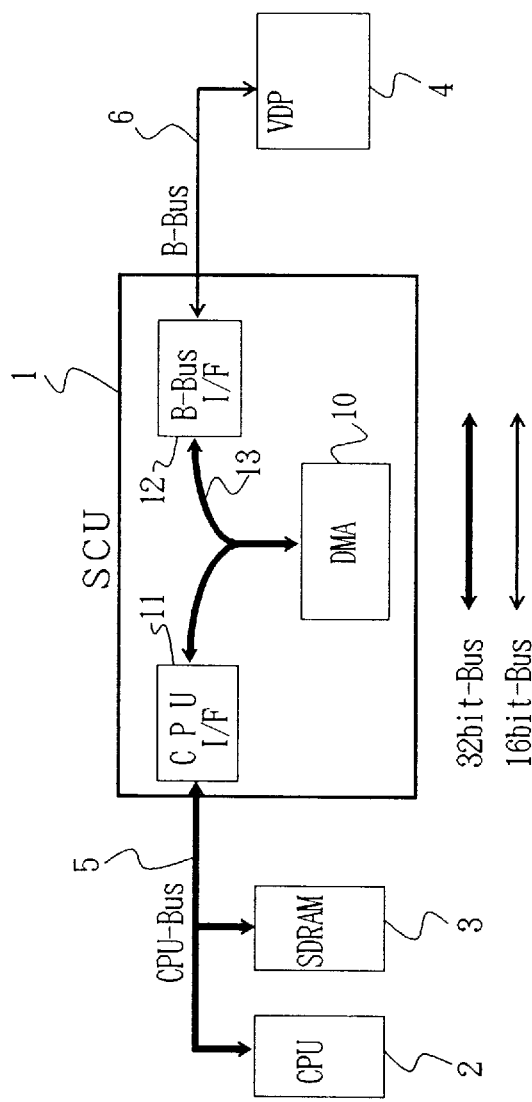
FIG. 11 is an explanatory diagram of an embodiment corresponding to the second feature of the present invention.

FIG. 11 shows a concept structure of a video game apparatus, in which the second feature according to the present invention is applied, similarly to the examples shown in FIGS. 4 and 6.

Therefore, the same reference numerals are used to denote and identify corresponding or identical numerals shown in FIGS. 4 and 6.

In comparison with the structure shown in FIG. 4, a basic structure shown in FIG. 11 according to the second feature of the present invention corresponds to the structure shown in FIG. 4, which includes the system control unit 1, the CPU 2, the synchronous DRAM 3, the first and second VDPs 41 and 42, the sound source processor 7, and the first bus (CPU-BUS) 5 and the second bus (B-BUS) 6 connecting the above-described circuits.

Further, a first bus interface circuit 11, a second bus interface circuit 12, and a direct memory access circuit (DMA) 10, which constitutes the system control unit 1 shown in FIG. 11 corresponds to the first bus interface circuit 11, the second bus interface circuit 12, and the direct memory access circuit (DMA) 10 shown in FIG. 6.

The third bus interface circuit 14 connected to the internal bus 13 disclosed in FIG. 6 is not shown in FIG. 11. This is because the structure of the third bus interface circuit 14 is the same as that of the second bus interface circuit 12, as the third bus interface circuit 14 is connected to the internal bus 13 of 32 bits and the external bus of 16 bits.

In FIG. 6, when data of 16 bits are transmitted from the second and third buses 6 and 8, which are respectively connected to the second and third bus interface circuits 12 and 14 to the first bus (CPU-BUS) 5, the flip flop circuits FF 124 and 125 and the tri-state buffer 126 in the second bus interface 12 compose two continuous data of 16 bits to data of 32 bits and output them to the internal bus 13. Further, the flip flop circuits FF 143 and 144 and the tri-state buffer 145 in the third bus interface 13 compose and output the data by the same way as in the second bus interface 12 to the internal bus 13.

The data of 32 bits outputted to the internal bus 13 are transmitted to the first bus (CPU-BUS) 5 via the DMA 10, the flip flop circuit FF 111 and a tri-state buffer 113 in the first bus interface circuit 11, as described above.

The synchronous DRAM 3 has a characteristic of making input and output signals be synchronized with a clock, and continuously reading and writing the signal data in addition to a characteristic of the conventional DRAM. As one example of the characteristic is shown in FIGS. 12A and 12B, the synchronous DRAM 3 synchronizes the operation of the conventional DRAM with a clock.

Figure 12A:
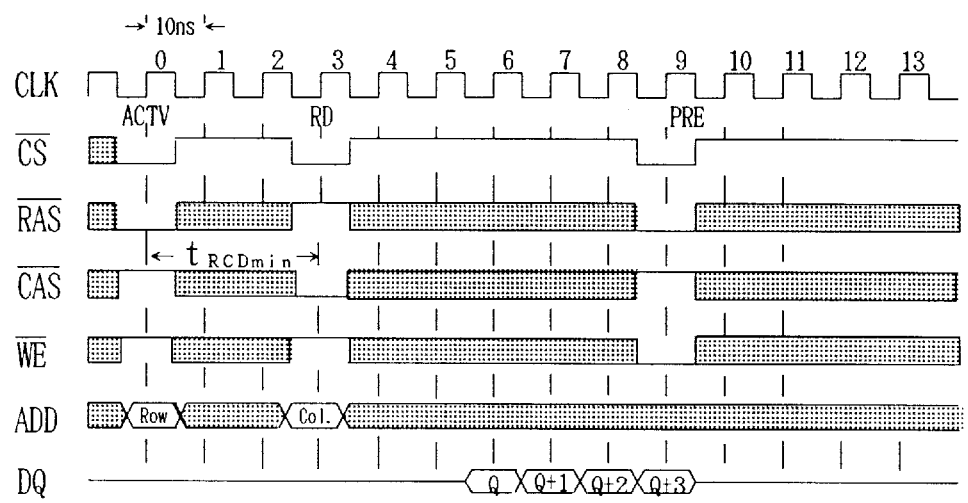
FIGS. 12A and 12B show an example of reading and writing operations of a general synchronous DRAM.
Figure 12B:
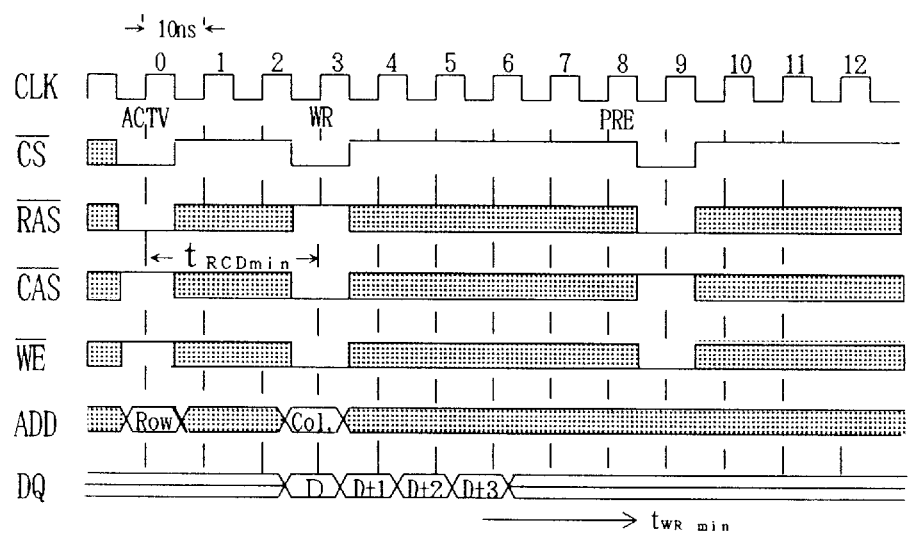

FIG. 12A shows a read operation of a general synchronous DRAM including the synchronous DRAM 3, and FIG. 12B shows a timing chart showing the write operation. The read and write operations are performed according to the control signals /RAS, /CAS and /WE.

These input signals as a control signal, are taken into by synchronizing on leading timings of the synchronous clocks CLK. A cycle period of the clock CLK is 10 ns, the clock frequency is 100 MHz. Therefore, it becomes possible to take into the input signals synchronized with the clock.

As the content of the timing chart is not directly related to the explanation of the present invention, detailed explanation is omitted. But, it can be understood from FIGS. 12A and 12B to continuously output and write data as indicated by DQs, which are read and write data, respectively.

In this way, data reading and writing operation is continuously performed as a feature of the synchronous DRAM. In the present invention, the synchronous DRAM is employed as a RAM, as described in FIG. 11. With the structure of the DMA 10 shown in FIG. 6, it is possible to provide data transferring device employing the feature of the synchronous DRAM.

Further, on the explanation of the second feature, although a case where the data of 32 bits on the first bus are divided into two sets of the data of 16 bits and sent to the second bus, the present invention is not restricted to this, and it is also possible to divide data of 32 bits into 1/n (n is positive integral) and send out divided data.

In the conventional device, there has been a problem of increasing access times, i.e., low speed in the DMA transferring operation, when starting to write data from the byte boundary, and writing per a byte. The third feature of the present invention is to solve the above-described problem, and it will now be explained.

Figure 1:
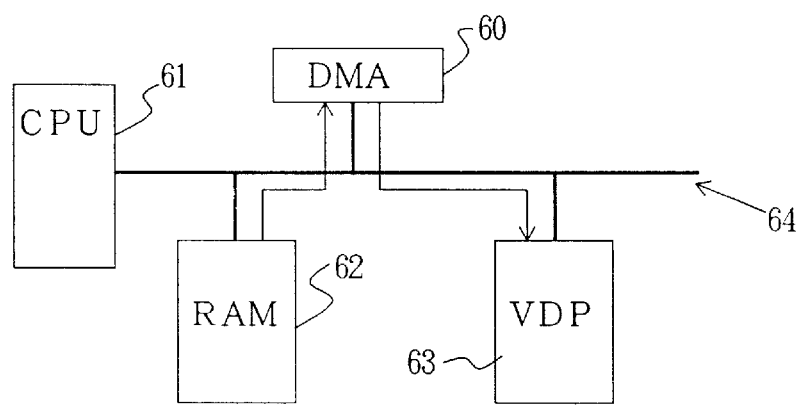
FIG. 1 shows an explanatory operational diagram of a conventional example corresponding to the second feature of the present invention.
Figure 3A:
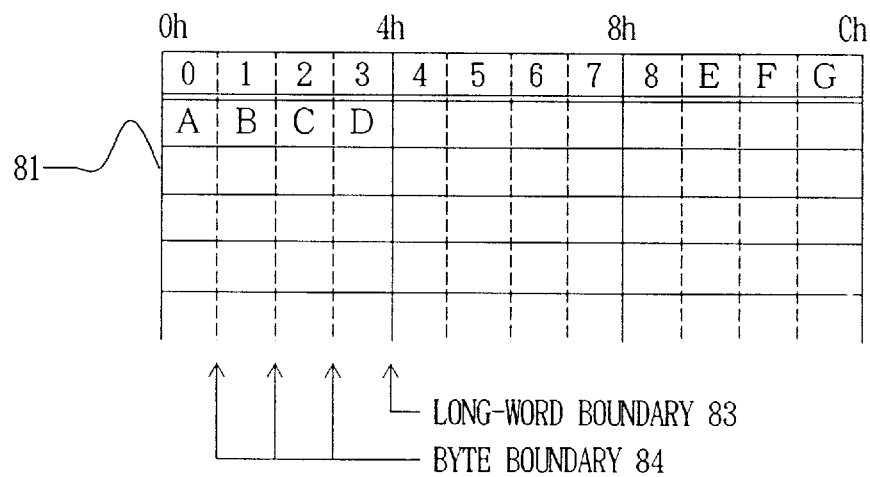
FIGS. 3A and 3B are an explanatory diagram of a conventional example corresponding to the third feature of the present invention.
Figure 3B:
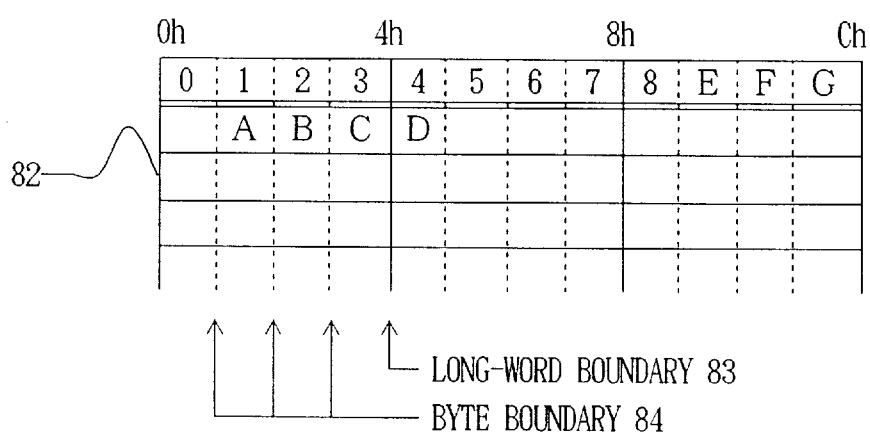

The third feature of the present invention is realized in the DMA 10 provided in the system control unit 1 of the embodiments shown in FIGS. 3 and 6.

The third feature of the present invention will be again explained in accompanying with a structure of the system control unit 1 shown in FIG. 6. Further, as the third interface circuit 14 has the same structure as the second interface circuit 12, as explained above, the duplicated explanation about the third interface circuit 14 will be omitted for simplicity.

In FIG. 6, the first interface circuit 11 includes a first latch circuit (flip flop) 110, which latches the signal S1 of 32 bits, a tri-state buffers 112, 113, which output ternary logic signals, and a second latch circuit 111, which latches the signal of 32 bits on the internal bus 13.

The second interface circuit 12 includes a first latch circuit 120, which latches data S6 of 32 bits on the internal bus 13, a selector 121, which receives and converts the parallel data S6 of 32 bits latched by and output from the first latch circuit 120 to a pair of data of 16 bits, a second latch circuit 122, which latches the data of 16 bits output from the selector 121 and a tri-state buffer 123, which receives the data of 16 bits latched by the second latch circuit 122 and outputs ternary logic signals to the second bus (B-BUS) 6.

Since the second interface circuit 12 transmits data on the second bus (B-BUS) 6 to the internal bus 13, the second interface circuit 12 includes a pair latch circuits 124 and 125 for data of 16 bits and a tri-state buffer 126, which composes the data of 16 bits latched by the pair latch circuits 124 and 125 and outputs data of 32 bits to the internal bus 13.

The DMA 10 includes a first latch circuit (flip flop) 101, which latches data of 32 bits on the internal bus 13, a second latch circuit (flip flop) 102, which latches the lower 3 bytes (24 bits) of the data, a selector 103, which receives combined signals of the outputs from the first and second latch circuits 101 and 102, selects and outputs the outputs according the selecting signal S5 supplied at the selecting terminal S, and a tri-state buffer 104, which receives and outputs the output from the selector 103 to the internal bus 13.

The selector 103 has four input terminals and one output terminal. That is, the output lines B1 to B4 of four bytes of the first latch circuit 101 are connected to the first input terminal 0 of the selector 103. The upper three bytes of the output lines B1 to B3 of the first latch circuit 101 and the lower one byte of the output line B7 of the second latch circuit 102 are connected to the second input terminal 1 of the selector 103.

The upper two bytes of the output lines B1 to B2 of the first latch circuit 120 and the lower two bytes of the output lines B6 to B7 of the second latch circuit 101 are connected to the third input terminal 2 of the selector 103. The upper one byte of the output line B1 of the first latch circuit 101 and the lower three bytes of the output lines B5 to B7 of the second latch circuit 102 are connected to the fourth input terminal 3 of the selector 103. Accordingly, the data of four bytes, which are not shifted, are inputted to the first input terminal 0. The data of four bytes, which are shifted by one byte, are inputted to the second input terminal 1. The data of four bytes, which are shifted by two bytes, are inputted to the third input terminal 2. The data of four bytes, which are shifted by three bytes are inputted to the fourth input terminal 3.

Figure 13:
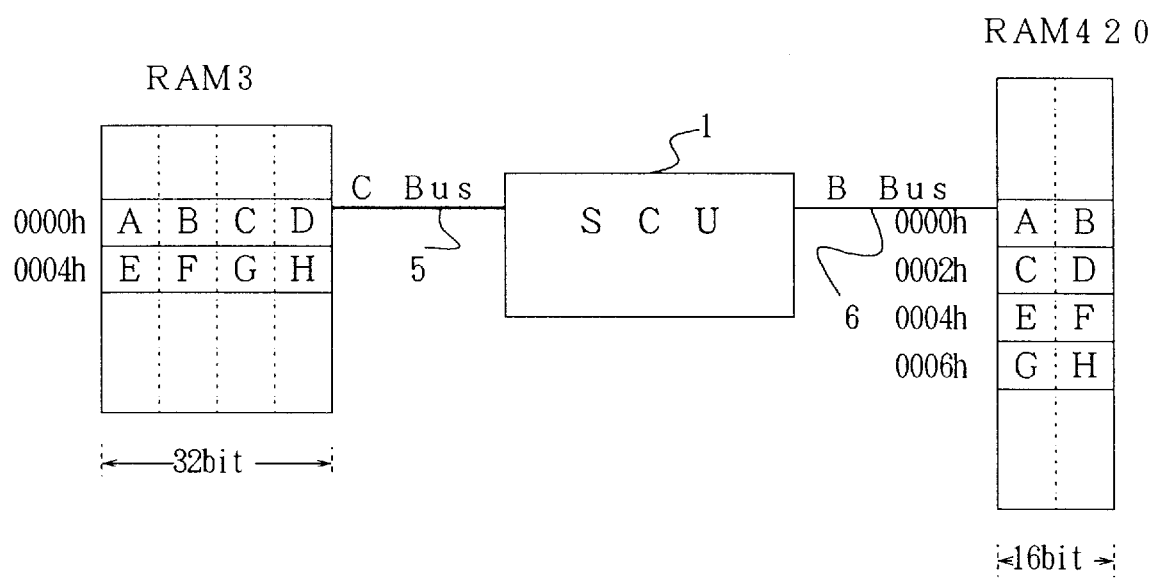
FIG. 13 is an embodiment corresponding to the third feature of the present invention to indicate an operational explanatory diagram of transferring per a unit of a plurality of bytes.
Figure 14:
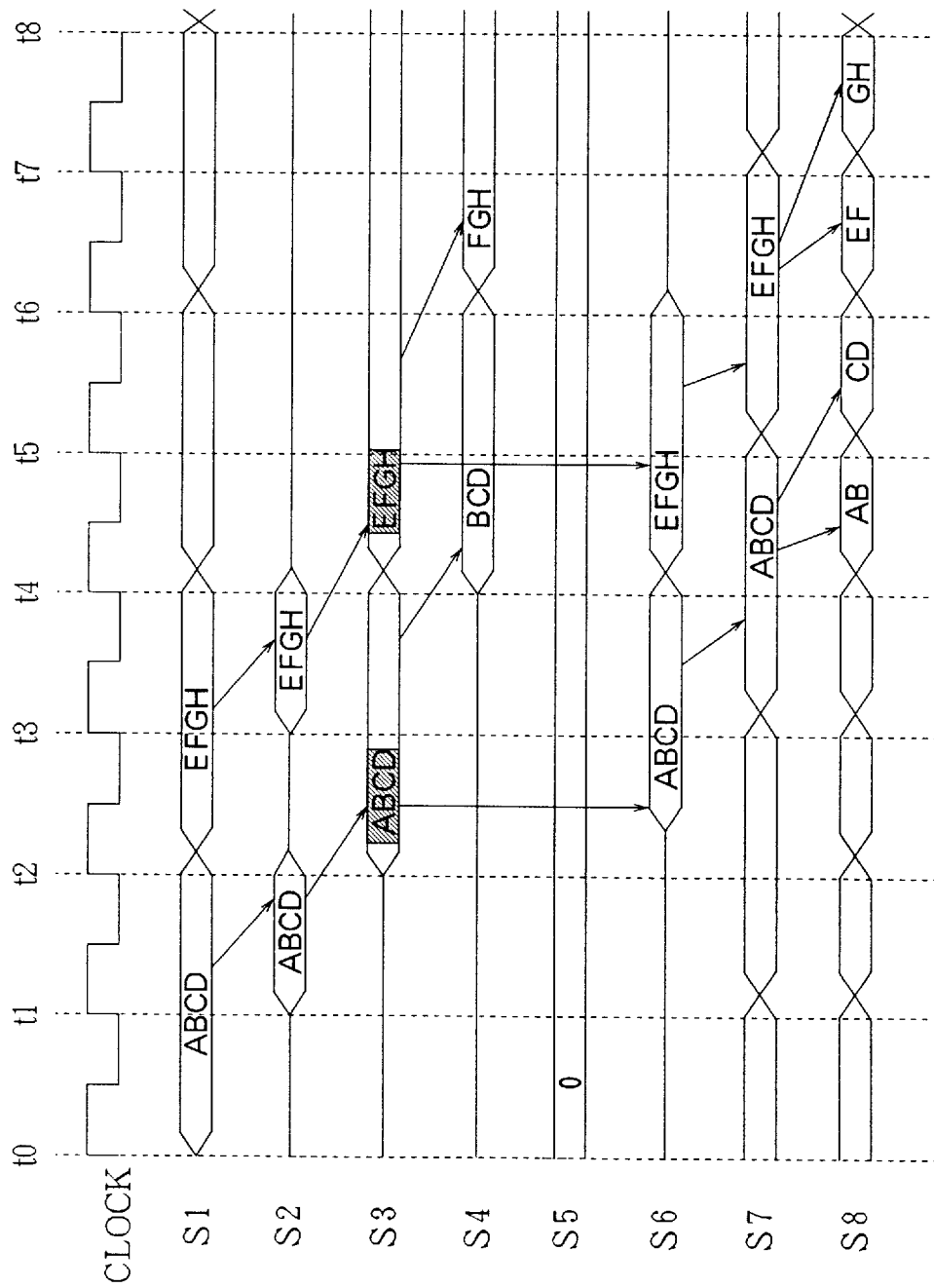
FIG. 14 shows an operational timing chart corresponding to FIG. 13.
Figure 15:
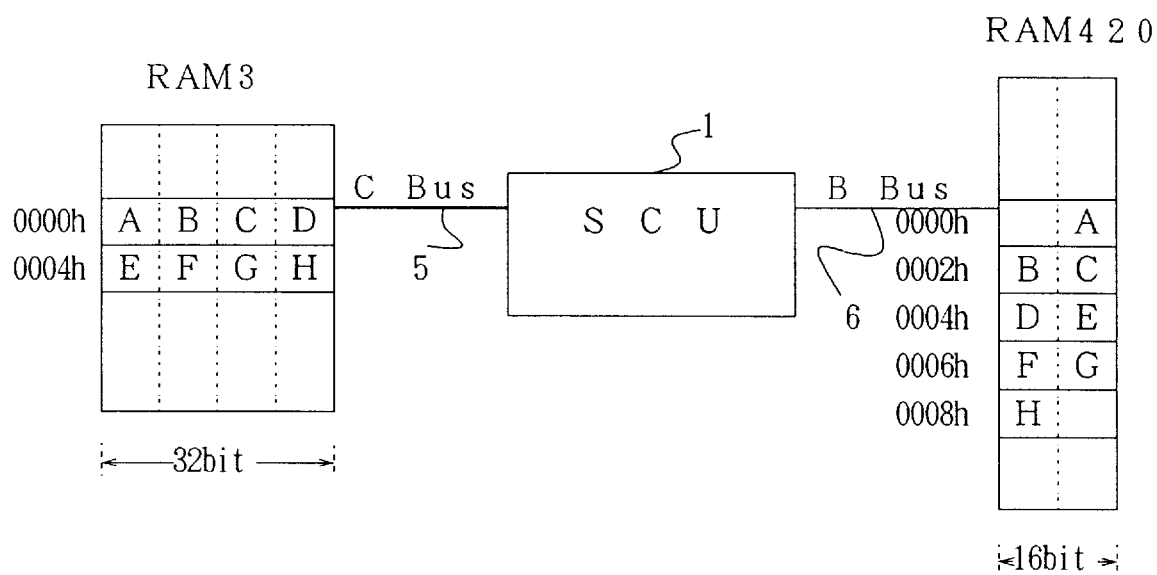
FIG. 15 shows one operational explanatory diagram of transferring of a byte boundary.
Figure 16:
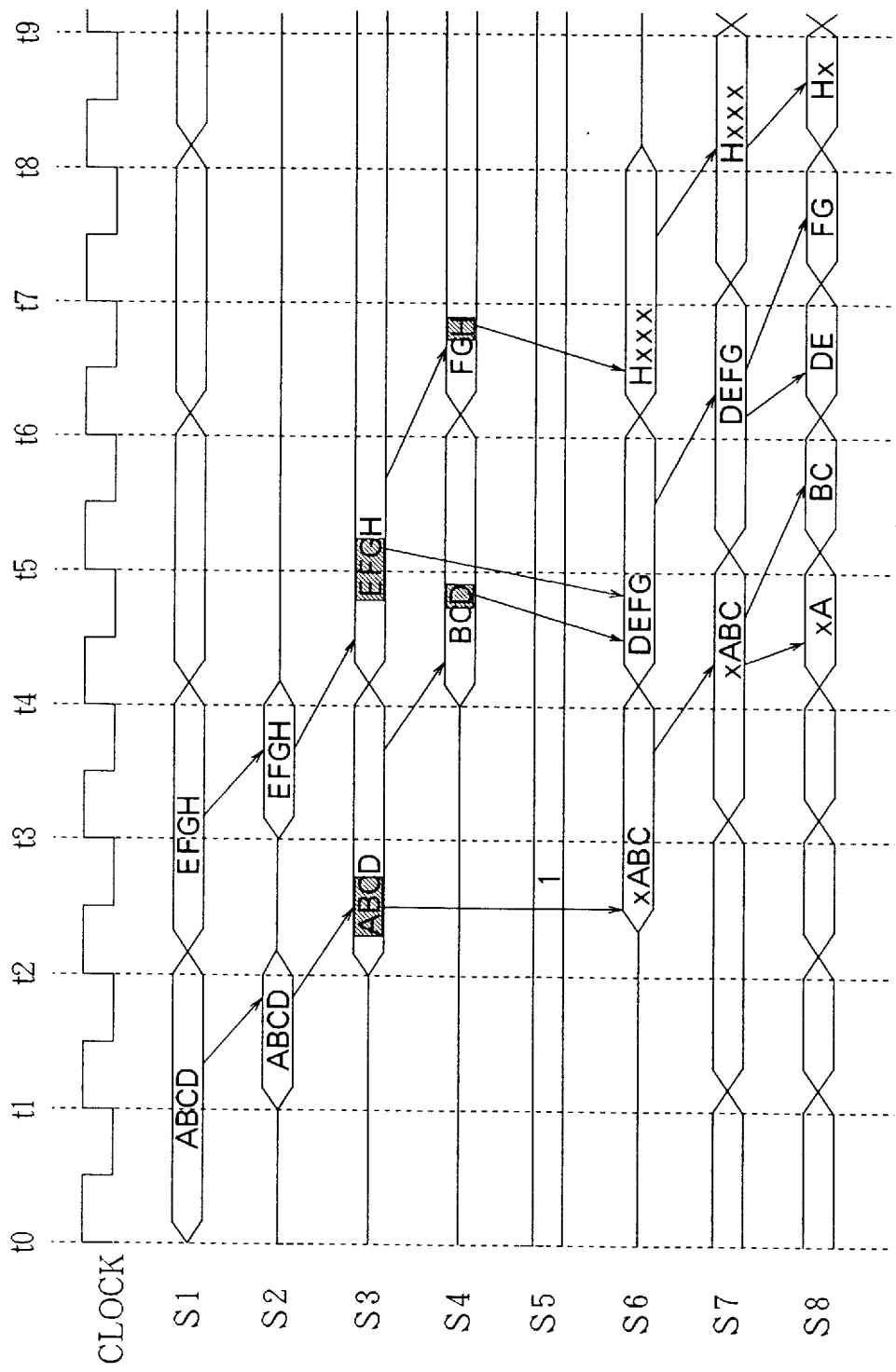
FIG. 16 shows an operational timing chart corresponding to FIG. 15.

Therefore, if the selecting signal S5 selects the first input terminal 0, transmission from a long-word boundary (refer to FIGS. 3A and 3B) will be performed as shown in FIGS. 13 and 14, which will be later described. Further, if the selecting signal S5 selects the second input terminal 1, transmission to the byte boundary, which is shifted by one byte, as shown in FIGS. 15 and 16, will be performed.

Furthermore, if the selecting signal S5 selects the third input terminal 2, transmission to the byte boundary, which is shifted by two bytes shown in FIGS. 17 and 18, which will be later explained, will be performed.

Figure 19:
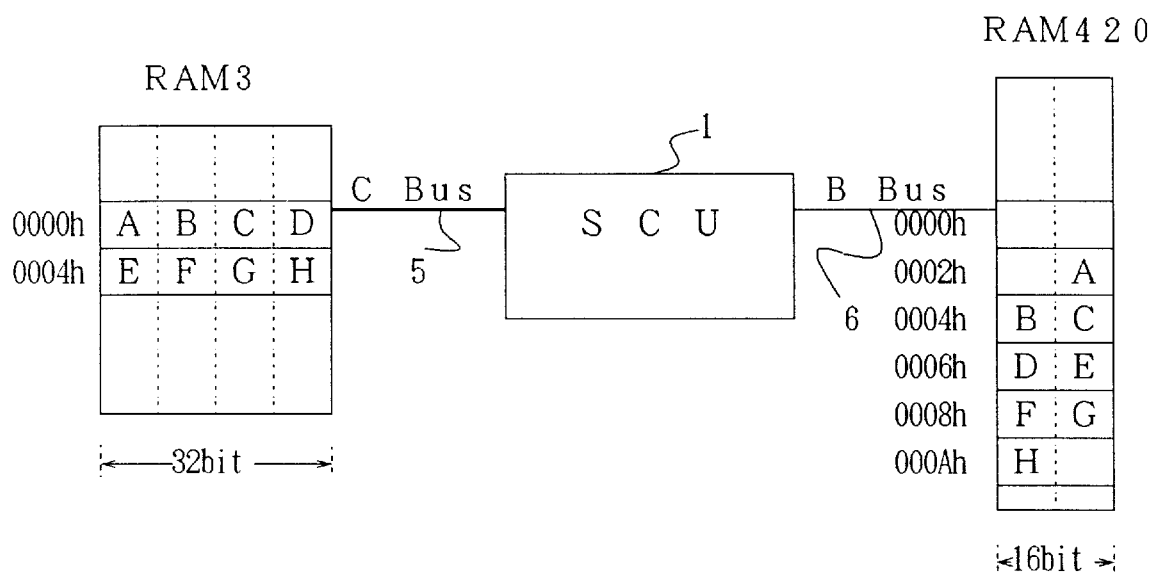
FIG. 19 shows other operational explanatory diagram of transferring byte boundary.
Figure 20:
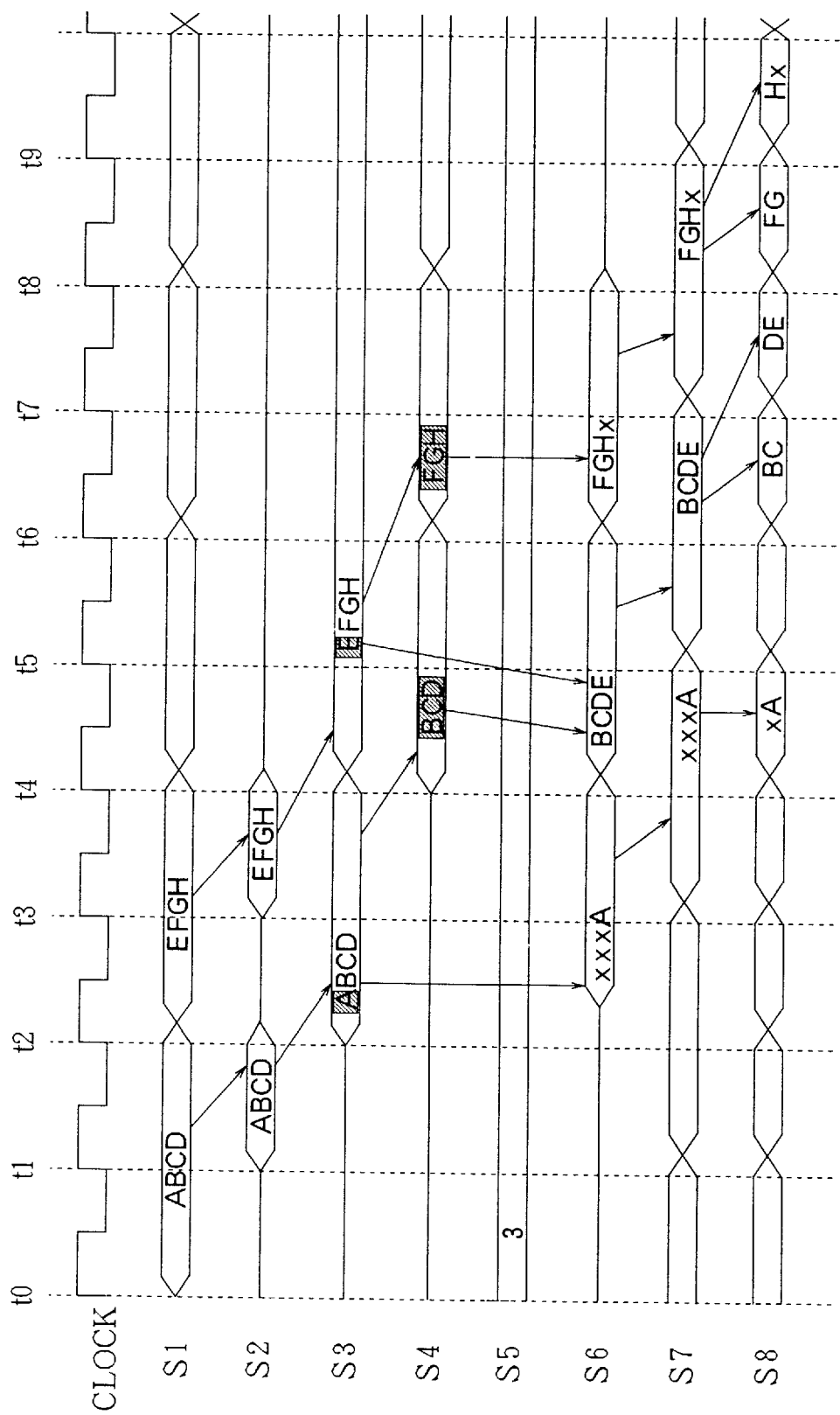
FIG. 20 illustrates an operational timing chart corresponding to FIG. 19.

If the selecting signal S5 selects the fourth input terminal 3, transmission to the byte boundary, which is shifted by three bytes shown in FIGS. 19 and 20, will be performed.

DMA transmission operation according to the third feature of the present invention will now be explained in accompanying with FIGS. 13 to 22.

At first, as shown in FIG. 13, a long-word boundary transmission will be explained as follows, which is to transmit the data "A B C D E F G H" of 8 bytes, that is, 32 bits on the addresses (0000h to 0007h) of the RAM 3, which corresponds to the SDRAM 3 shown in FIG. 4, on the first bus (CPU-BUS) 5 to the corresponding addresses (0000h to 0007h) of the RAM 420, which corresponds to the VRAM 420 connected to the VDP 42 in FIG. 2 on the second bus (B-BUS) 6 via the system control unit 1.

As shown in FIG. 14, it is controlled that the 4 bytes of data S1 are outputted per two clocks on the first bus (CPU-BUS) 5. The data S1 is outputted to the internal bus 13 at the timing of t1 (signal S2). Then, the parallel data S2 of four bytes on the internal bus 14 are latched by a first latch circuit 101 in the DMA 10 at the timing of t2 (signal S3).

The output S3 of the first latch circuit 101 is latched by the second latch circuit 102 at the timing of t4 (signal S4). Then, the selecting signal S5 for the selector 103 indicates the first input terminal 0 in order to transfer from the long-word boundary.

Accordingly, the selector 103 selects the data "ABCD" of four bytes latched in the first latch circuit 101 to output the data as data S6. The second interface circuit 12 takes the data S6 into the latch circuit 120 at the timing of t3.

As the second bus (B-BUS) 6 is 16 bits, as shown with the signal S8, the selector 121 and the latch circuit 122 convert the data of 32 bits to two serial data sets, each of which has 16 bits. The data are outputted to the second bus (B-BUS) 6 via the tri-state buffer 123.

In this way, each data unit having a plurality of bytes is written from the long-word boundary as shown in FIG. 14.

Similarly to FIG. 13, when the data, of which addresses are 0000h to 0007h, of the RAM 3 on the first bus (CPU-BUS) 5 are transferred to the RAM 420, of which addresses are 0001h to 0008h, on the second bus (B-BUS) 6, the DMA transmission starting from a byte boundary, which is shifted by one byte, in this example, as shown in FIG. 15 will be now explained.

As shown in FIG. 16, the data S1 of four bytes is outputted per two clocks on the first bus (CPU-BUS) 5. The data S1 is outputted to the internal bus 13 at the timing of t1 (signal S2). Then, the four bytes of parallel data S2 on the internal bus 13 is latched in the first latch circuit 101 of the DMA 10 at the timing of t2 (signal S3).

The lower three bytes of the output data S3 from the first latch circuit 101 are latched in the second latch circuit 102 at the timing of t4 (signal S4). Because of a transmission from a byte boundary, which is shifted by one byte, the selecting signal S5 of the selector 103 indicates the second input terminal 1.

Accordingly, the selector 103 selects the data "ABC" of the upper three bytes (lines 1 to B3) in the first latch circuit 101 and the data of the lower one byte (line B7) in the second latch circuit 102 and outputs them as data S6, which is "xABC". "x" means data is unsettled.

In the second interface circuit 12, the latch circuit 101 takes the data "XABC" at the timing of t3. Then, as the second bus (B-BUS) 6 has the bus size of 16 bits, as shown with the signal S8, the selector 102 and the latch circuit 122 convert the data of 32 bits to two serial data of 16 bits. The data are then outputted to the second bus (B-BUS) 6 via a tri-state buffer 123.

Simultaneously, at the timing of t4, the first latch circuit 101 of the DMA 10 latches the parallel data S2, "EFGH" of four bytes on the output terminal.

Therefore, the selector 103 selects the upper data "EFG" (lines B1 to B3) of 3 bytes of the first latch circuit 101 and the lower data "D" (line B7) of one byte and outputs them as data S6. Accordingly, the data are "DEFG".

In this way, writing per a unit having a plurality of bytes will be started from the byte boundary, which is shifted by one byte, as shown in FIG. 15.

Figure 17:
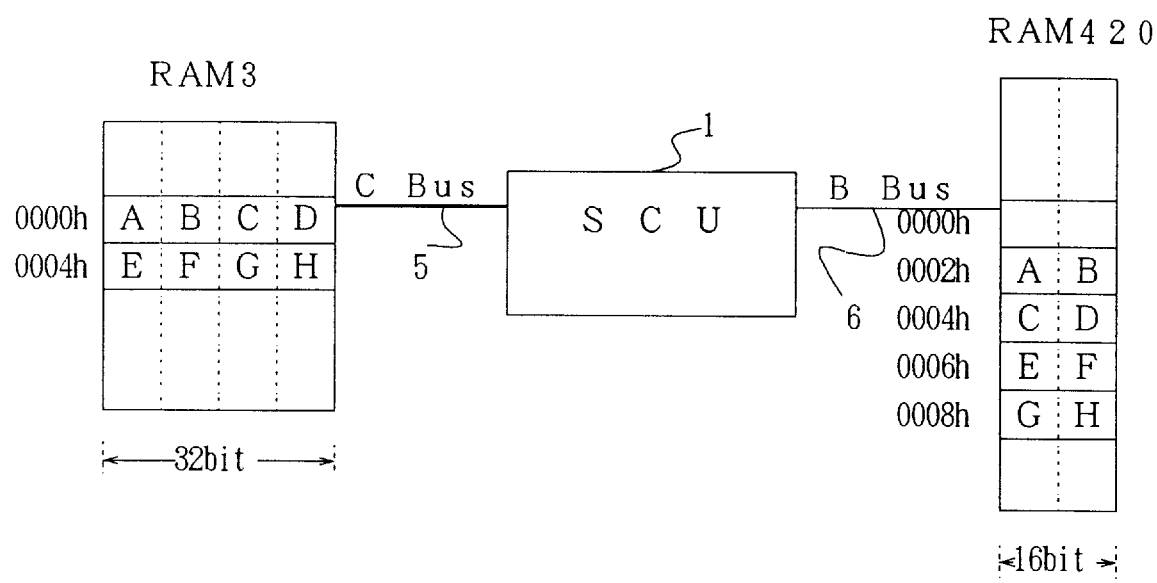
FIG. 17 shows one operational explanatory diagram of transferring of a byte boundary.

Next, as shown in FIG. 17, the DMA transmission starting from a byte boundary, which is shifted by two bytes, will be explained which is to transmit data (0000h to 0007h) of the RAM 3 (0000h to 0007h) on the first bus (CPU-BUS) 5, to the RAM 420 (0002h to 0009h) on the second bus (B-BUS).

Figure 18:
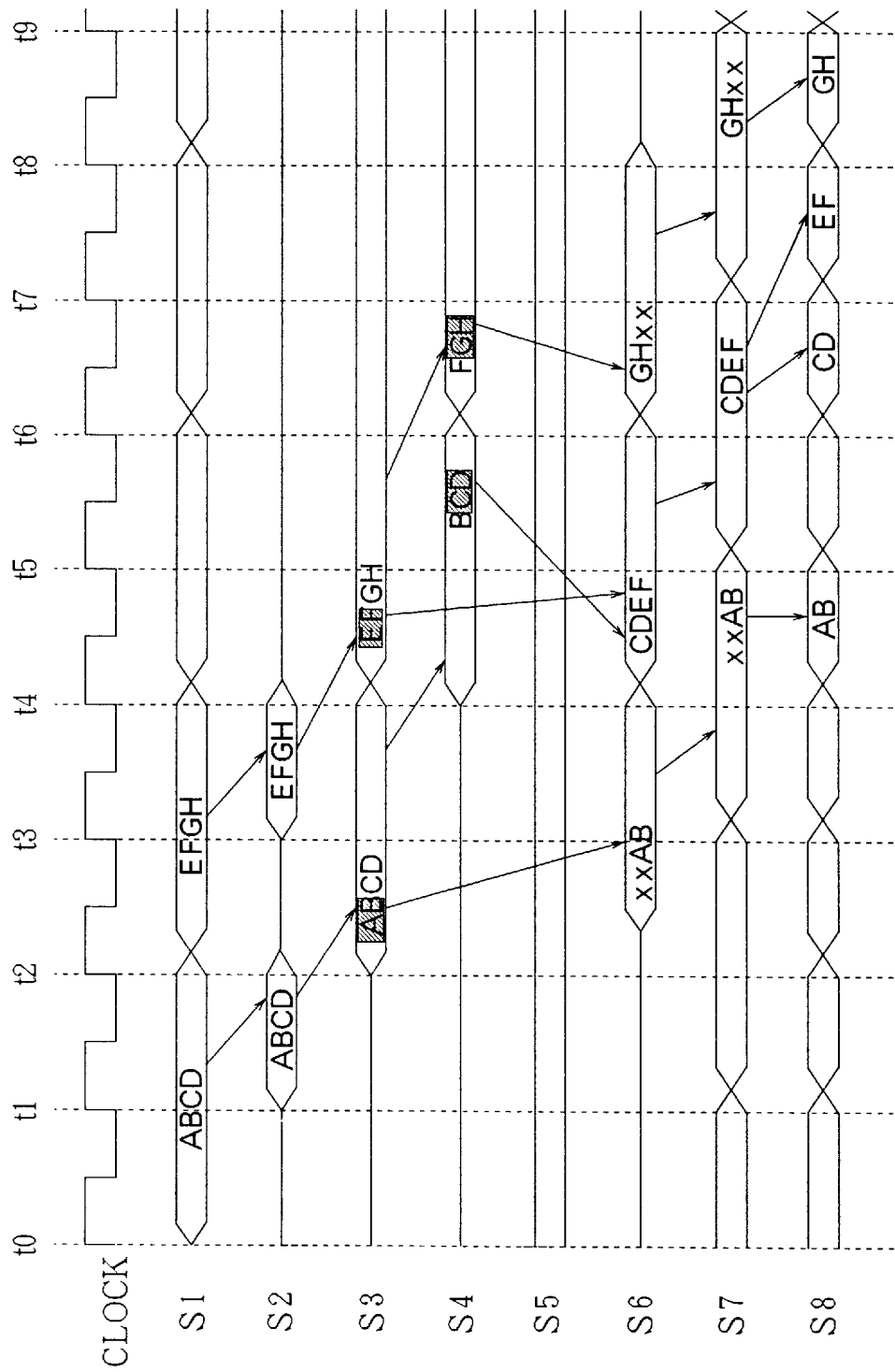
FIG. 18 shows an operational timing chart corresponding to FIG. 17.

As shown in FIG. 18, the data S1 of four bytes are outputted per two clocks on the first bus (CPU-BUS) 5. The data S1 is outputted to the internal bus 13 at the timing of t1 (signal S2). Then, the first latch circuit 101 of the DMA 10 latches the parallel data S2 of four bytes on the internal bus 13 at the timing of t2 (signal S3).

The second latch circuit 121 latches the data of lower three bytes of the output S3 from the first latch circuit 101 at the timing of t4 (signal S4). Because the transmission is started from the byte boundary, which is shifted by two bytes, the selecting signal S5 of the selector 103 indicates the third input terminal 2.

Accordingly, the selector 103 selects the upper data "AB" (lines B1 to B2) of two bytes latched in the first latch circuit 101 and the lower 2 bytes (lines B6 to B7) in the second latch circuit 102, and outputs them as data S6. The data are "xxAB". "x" means the data are unsettled as the same as the above-described example.

In the second interface circuit 12, the latch circuit 120 takes the data at the timing of t3. Then, as the second bus (B-BUS) 6 has the bus size of 16 bits, as shown with the signal S8, the selector 121 and the latch circuit 122 convert the data of 32 bits to two serial data of 16 bits. The data are outputted to the second bus (B-BUS) 6 via a tri-state buffer 123.

Simultaneously, the first latch circuit 101 in the DMA 10 latches the parallel data S2, i.e., data "EFGH" of four bytes on the internal bus 13 (signal S3) at the timing of t4.

Therefore, the selector 103 selects the data "EF" (lines B1 to B2) of upper 2 bytes in the first latch circuit 101 and the data "CD" (lines B6 and B7) of lower 2 bytes in the second latch circuit 102 and outputs them as data S6. The data are "CDEF".

In this way, writing per a unit of a plurality of bytes started from the byte boundary, which is shifted by two bytes, shown in FIG. 17, is performed.

As shown in FIG. 19, DMA transmission starting from the byte boundary, which is shifted by three bytes, will be explained as follows. By the DMA transmission, the data (0000h to 0007h) of the RAM 3 on the first bus (CPU-BUS) 5 are transferred to the RAM 420 on the B-BUS 6.

As shown in FIG. 20, the data S1 of four bytes are outputted on the first bus (CPU-BUS) 5 per two clocks. The data S1 are then outputted to the internal bus 14 at the timing of t1 (signal S2). Then, the first latch circuit 101 latches the 4 bytes of parallel data S2 of four bytes on the internal bus 13 at the timing of t2 (signal S3).

The second latch circuit 102 latches the lower data of three bytes of the output S3 latched in the first latch circuit 101 at the timing of t4 (signal S4). Because transmission is started from a byte boundary, which is shifted by three bytes, the selecting signal S5 of the selector 103 indicates the fourth input terminal 3.

Therefore, the selector 103 selects the upper data (line B1) of one byte in the first latch circuit 101 and the lower data (lines B5 to B7) of three bytes in the second latch circuit 102, and outputs them as data S6. The data are "xxxA". "x" means data is unsettled.

In the second interface circuit 12, the latch circuit 120 takes the data at the timing of t3. Then, the second bus (B-BUS) 6 has the size of 16 bits, as shown with the signal S8, the selector 121 and the latch circuit 122 convert the data of 32 bits to two serial data of 16 bits. The data are outputted to the second bus (B-BUS) 6 via a tri-state buffer 123.

Simultaneously, the first latch circuit 101 of the DMA 10 latches the parallel data S2 of four bytes on the internal bus 13, i.e., data "EFGH", at the timing of t4 (signal S3).

Therefore, the selector 103 selects the upper data "E" (line B1) of one byte in the first latch circuit 101 and the lower data "BCD" (lines B5 to B7) of three bytes in the second latch circuit 121 and outputs them as data S6. The data are "BCDE".

In this way, writing per a unit having a plurality of bytes is started from the byte boundary, which is shifted by three bytes, as shown in FIG. 19.

Figure 21:
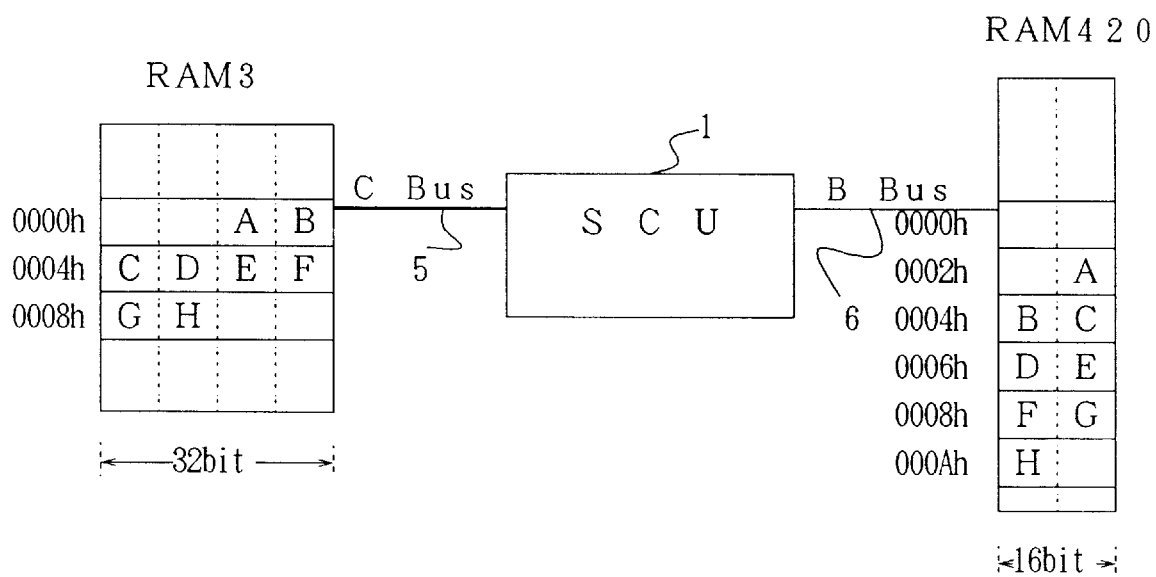
FIG. 21 illustrates another operational explanatory diagram for transferring of a byte boundary.

FIG. 21 shows an explanatory diagram of transferring DMA started from the byte boundary, which is shifted to 1 byte, which is to transmit the data (0002h to 0009h) of the RAM 3 on the first bus (CPU-BUS) 5 to the RAM 420 (0003h to 000Ah) on the second bus (B-BUS) 6.

Figure 22:
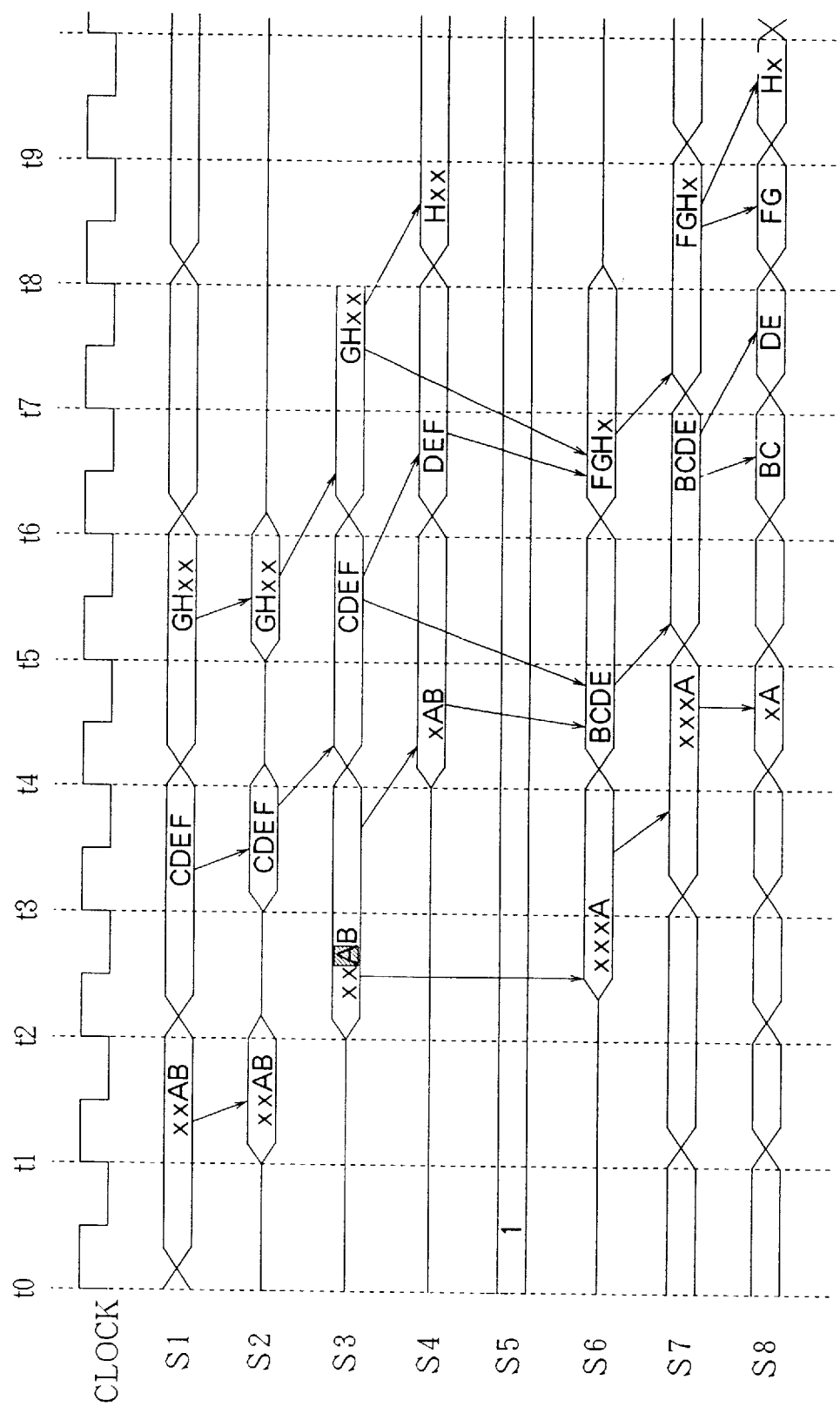
FIG. 22 shows an operational timing chart corresponding to FIG. 21.

It is apparent from FIG. 22 that the operation of the example in FIG. 21 is basically the same as that shown in FIG. 16. In this way, even if the data of the RAM 1, i.e., SDRAM 3, are shifted from the long-word boundary, the data can be transferred per a unit having a plurality of bytes to the byte boundary position shifted from the long-word boundary.

The above-described RAM 2 corresponds to the VRAM 420 in FIG. 2, i.e., a bit map memory, which expresses one pixel with one byte. In this case, for example, it is effective for subsequently shifting and displaying moving pictures to start writing from an optional byte boundary. Then, in the case employing the present invention, it can be realized with, at most, 5 times of accessing to transfer data for 16 pixels. In the conventional transmission per a byte, it is required to access 16 times. Therefore, the times of transferring becomes less than about ⅓, so that the transferring can be performed with a high speed for displaying video image.

Further, some variations can be applied to the above-described third feature of the present invention as follows;

Although a unit byte number n of the long word is 4, other number may be employed.

The second memory is explained as a bit map memory. However, other memory may be applied. Further, the second memory has the size of 16 bits, but the memory having the size of 32 may also be applied.

Although the B-BUS has the size of 16 bits in the embodiment of the present invention, the bus of 32 bits may be employed.

As explained according to the embodiments, a data transferring device, which can simultaneously transfer data between a plurality of data transmitting and receiving devices may be obtained.

Further, a data transferring device, which has no need to provide an interface circuit interfacing to a high-speed CPU via a data transmitting and receiving device may be obtained, even if bus sizes of a plurality of data transmitting and receiving devices are different.

Furthermore, according to the present invention, a video game apparatus employing a data transferring device is realized, which may employ a high-speed CPU.

Additionally, it becomes possible to transfer data, as employing a characteristic of a synchronous DRAM, which can continuously read out data. Even if a data transferring device writes data from the byte boundary to the bit map memory, the data transferring device employing a DMA may reduce times of accessing according to the present invention.

A data transferring device employing the DMA, which can reduce transferring time when writing data from the byte boundary can be also realized.

Although the present invention has been described with reference to embodiments, when applying to a structure of a video game apparatus, the present invention is not restricted to those.

It should of course be understood that those which are the same as the technical concept of the invention are within the protective scope of the present invention.

What is claimed is:

1. A data transferring device, which is connected to a plurality of data transmitting and receiving devices via corresponding external buses, for transferring data between the plurality of the data transmitting and receiving devices comprising:

a plurality of bus interface circuits, to which each of the corresponding external buses is connected; and a direct memory access circuits operatively connected to the plurality of bus interface circuits by an internal bus for transferring the data between the plurality of bus interface circuits.

2. The data transferring device according to claim 1, wherein at least two of the plurality of bus interface circuits are respectively connected to external buses, each having a different bus size from that of the other, the internal bus has a bus size corresponding to the maximum one within the bus sizes of said external buses, and a data processing circuit for dividing or uniting data to accord with the bus size of either one, to which the data are transferred, of the external buses, when the data are transferred between the external buses, each having different bus sizes.

3. The data transferring device according to claim 2, wherein the data processing circuit divides data on a first external bus having a first bus size and sequentially transfers the divided data to a second external bus having a second bus size, which is smaller than the first bus size, according to a plurality of timings.

4. The data transferring device according to claim 2, wherein the data processing circuit unites data for a plurality of timings on a second external bus having a second bus size and sequentially transfers the united data to a first external bus having a first bus size, which is larger than the second bus size.

5. An information processing apparatus, comprising:

a data transferring device, which is connected to a plurality of data transmitting and receiving devices via corresponding external buses, for transferring data between the plurality of the data transmitting and receiving devices, said data transferring device including a plurality of bus interface circuits, to which each of the corresponding external buses is connected, wherein at least two of the plurality of bus interface circuits are respectively connected to external buses, each having a different bus size from that of the other, and a direct memory access circuit, operatively connected to the plurality of bus interface circuits by an internal bus, for transferring the data between the plurality of bus interface circuits, and wherein at least one of the plurality of the bus interface circuits is connected with a data transmitting and receiving device via an external bus from the outside of the information processing apparatus, and the bus size of the external bus connected to the data transmitting and receiving device has the minimum size within the external buses connected to the data transferring device.

6. A data transferring device connected to a first external bus and a second external bus having 1/n (n means positive integer) of the bus size of the first external bus, comprising:

first and second bus interface circuits, to which the first and second external buses are respectively connected;

a direct memory access circuit for transferring data on the first external bus, which are transmitted to the first bus interface circuit, to the second bus interface circuit; and an internal bus connected to the first and second bus interface circuits and the direct memory access circuit, having the same bus size as that of the first external bus, the first bus interface circuit converting the data, which are continuously transmitted with a predetermined period synchronized with a clock signal, on the first external bus to the data having 1/n of the predetermined period and outputting the converted data to the internal bus, the direct memory access circuit shifting the data by a 1/n period and re-transmitting the shifted data to the internal bus, and the second bus interface circuit taking the data of 1/n of the predetermined period, which are re-transmitted from the direct memory access circuit to the internal bus, making the taken data to a continuous data sequence with the 1/n period, and re-transmitting the continuous data sequence with the 1/n period to the second external bus.

7. The data transferring device according to claim 6, wherein the positive integer n is 2.

8. The data transferring device according to claim 7, wherein the second interface circuit makes data, taken in the direct memory access circuit, on the first external bus, to upper and lower data, which respectively are one half data sequence of the data and transfers the upper and lower data to the second external bus.

9. The data transferring device according to claim 6, further comprising a synchronous DRAM, of which inputs and outputs are synchronized with a clock, connected to the first external bus to read data output from the synchronous DRAM and send the data to the first bus interface circuit.

10. A video game apparatus comprising:

a CPU for executing a game program;

a first video display processor for controlling displayed models or sprites on a picture plane;

a second video display processor for controlling a scroll of the picture plane and determining priority of displayed pictures; and a system control unit connected to the CPU, each of the first and second video display processors, through corresponding external buses, including, a first bus interface circuit, to which the CPU is connected, a second bus interface circuit, to which the first and second video display processors are connected, and a direct memory access circuit for transferring data, which are transmitted to the first bus interface circuit, to the second bus interface circuit.

11. The video game apparatus according to claim 10, further comprising, a storage memory device provided outside of a console unit and connected to the system control unit for storing a game program, which is executed by the CPU.

12. A direct memory access circuit, which reads in and transfers data per a plurality of n bytes, comprising:

a first latch circuit for latching n bytes of data, which are read in;

a second latch circuit operatively connected to the first latch circuit for latching (n−1) bytes of the data output from the first latch circuit; and a selector supplied with the n bytes of data latched in the first latch circuit and combined n bytes, which are formed by combining the latched n byte data of the first latch circuit with the latched (n−1) byte data of the second latch circuit and shifting sequentially by one byte, for selecting a desired set of n bytes of data from the supplied n bytes.

13. The direct memory access circuit according to claim 12, wherein a destination, to which the data selected by the selector is transferred is a bit map memory.

14. The direct memory access circuit according to claim 12, wherein the selected set of n bytes of data by the selector is transferred to a memory wherein each one pixel is expressed with one byte.

* * * * *

UNITED STATES PATENT AND TRADEMARK OFFICE
CERTIFICATE OF CORRECTION

PATENT NO : 5,816,921
DATED : Oct. 6, 1998
INVENTOR(S): Osamu Hosokawa

It is certified that error appears in the above-identified patent and that said Letters Patent is hereby corrected as shown below:

COLUMN 18

Claim 1, Line 8:

"a direct memory access circuits operatively connected to" should read
--a direct memory access circuit, operatively connected to--.

Claim 1, line 9:

"the plurality of bus interface circuits by an internal bus" should read
--the plurality of bus interface circuits by an internal bus,--.

Signed and Sealed this

Second Day of February, 1999

Attest:

Attesting Officer

*Acting Commissioner of Patents and Trademarks*